United States Patent
Kashioka

(10) Patent No.: US 8,610,922 B2
(45) Date of Patent: Dec. 17, 2013

(54) INFORMATION PROCESSING APPARATUS, IMAGE INPUT APPARATUS, DOCUMENT DISTRIBUTION SYSTEM, AND CONTROL METHOD THEREFOR

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 12/498,395

(22) Filed: Jul. 7, 2009

(65) Prior Publication Data

US 2010/0007928 A1 Jan. 14, 2010

(30) Foreign Application Priority Data

Jul. 11, 2008 (JP) ................................. 2008-181987

(51) Int. Cl.
*G06F 3/12* (2006.01)
*G06K 15/00* (2006.01)
*H04N 1/04* (2006.01)

(52) U.S. Cl.
USPC .......................... 358/1.15; 358/474; 358/1.14

(58) Field of Classification Search
USPC ........ 358/474, 1.18, 1.15, 1.14, 2.1; 382/312; 707/200; 715/810, 744
See application file for complete search history.

(56) References Cited

U.S. PATENT DOCUMENTS

| 8,427,683 B2* | 4/2013 | Mitsui | 358/1.15 |
| 8,503,020 B2* | 8/2013 | Soga | 358/1.15 |
| 2005/0254098 A1 | 11/2005 | Matsuda | 358/402 |
| 2006/0085524 A1 | 4/2006 | Lee | 709/220 |
| 2006/0087680 A1 | 4/2006 | Maeda | |
| 2006/0221407 A1 | 10/2006 | Uchida et al. | |
| 2006/0294154 A1* | 12/2006 | Shimizu | 707/200 |
| 2007/0217678 A1 | 9/2007 | Kato | 382/180 |
| 2008/0022212 A1* | 1/2008 | Kodimer et al. | 715/744 |
| 2008/0252936 A1 | 10/2008 | Stratton | 358/403 |
| 2009/0316212 A1* | 12/2009 | Sano | 358/2.1 |

FOREIGN PATENT DOCUMENTS

| JP | 2006-120041 A | 5/2006 |
| JP | 2006-287389 A | 10/2006 |

OTHER PUBLICATIONS

European Search Report issued in the counterpart application No. 09164439.3 dated Jul. 5, 2010—9 pages.

* cited by examiner

*Primary Examiner* — Charlotte M Baker
*Assistant Examiner* — Rury Grisham
(74) *Attorney, Agent, or Firm* — Fitzpatrick, Cella, Harper & Scinto

(57) ABSTRACT

Upon a user selecting and associating document data and a digital multifunction peripheral on a computer screen, the document data associated with the selected digital multifunction peripheral is searched for, scan settings using the document data as model data are extracted, and the extracted scan settings, as well as information as to a storage location of the document data are transmitted to the digital multifunction peripheral, in order to request button registration. The digital multifunction peripheral receiving the request presets the received scan settings, registers a scan and transmit button using the received storage location as a transmission destination, and displays it through a user interface. Upon pressing the scan and transmit button, a document is scanned with the scan settings associated therewith and the acquired document data is transmitted to the transmission destination associated with the scan and transmit button.

7 Claims, 15 Drawing Sheets

INFORMATION PROCESSING APPARATUS, IMAGE INPUT APPARATUS, DOCUMENT DISTRIBUTION SYSTEM, AND CONTROL METHOD THEREFOR

BACKGROUND OF THE INVENTION

1. Field of the Invention

The present invention relates to an information processing apparatus using a scanning and transmitting function of a digital multifunction peripheral, an image input apparatus, a document distribution system, and a control method therefor. In particular, the present invention relates to an information processing apparatus for registering a scan and transmit button in association with a digital multifunction peripheral and performing scanning and transmission by only a user operation that associates an already-stored document and a digital multifunction peripheral with each other; an image input apparatus (such as a digital multifunction peripheral); a document distribution system (e.g. comprising an information processing apparatus and an image input apparatus); and a control method therefor.

2. Description of the Related Art

These days, a large number of document management systems are available for reading documents in a paper-medium form using a variety of readers, for sorting such document information in electronic-data form, and for storing the sorted data in databases in order to make data searches easier. In particular, in recent years, more attention has been given to activities and laws, such as internal control or the SOX Act, for the purpose of improving or providing for the sound running of companies or organizations. Therefore, a number of opportunities to store scan data (i.e. electronic data representing scanned documents) obtained by converting documents into electronic-data form is increasing with the trend toward information technology (IT) as a format for document storage.

One example of an apparatus for reading a variety of documents is a digital multifunction peripheral, which can be equipped with many functions, such as copying, printing, faxing, scanning, scanning and transmitting, storing, and the like, and which has become widely available in offices. Users of such digital multifunction peripherals need to complete the operations they perform with these peripherals in a short time with a minimum of effort. In other words, they are required to carry out a job with such peripherals as quickly and efficiently as possible. However (and perhaps surprisingly), because of the complexity of the above-described digital multifunction peripherals, the practical reality is that users sometimes cannot easily execute an activity as potentially straightforward as a document scanning and transmitting operation. Users are therefore not exploiting the full potential of digital multifunction peripherals.

In an attempt to solve the above problem, conventional technology has proposed that a setting operation performed on an operation panel of a digital multifunction peripheral is implemented using an application that is running on an information processing apparatus (e.g. a PC) connected through a network to the multifunction peripheral (see, for example, Japanese Patent Laid-Open No. 2006-287389). According to this technology, as a result of registering a scan and transmit button with a digital multifunction peripheral, scanning and transmission can be implemented without occupying the digital multifunction peripheral (i.e. without keeping the digital multifunction peripheral unavailable to others for extended periods).

With this conventional technology, a user generates a file called a "shortcut to scanned document" through the information processing apparatus. Specifically, the shortcut file is generated by inputting scan information settings and a designated storage location with the user interface (e.g. monitor and keyboard) of the information processing apparatus (e.g. PC), and the generated shortcut file is registered with the multifunction peripheral, which thereby achieves a single-button operation.

As another conventional technology to simplify printing, a user interface using icons has been proposed. This conventional technology has proposed a print-instruction program in which the print settings for a specific printer have been stored associated with a "print settings" icon, using a special-purpose setting application, and a document data icon is associated with the print settings icon in order to transmit a print job to the printer (see, for example, Japanese Patent Laid-Open No. 2006-120041).

With this conventional technology, through an operation of dragging and dropping a document data icon onto a print settings icon, document data and print settings can be transmitted as a print job to a printer.

With the method described in Japanese Patent Laid-Open No. 2006-287389, the time a digital multifunction peripheral is occupied by a user can be shortened as a result of creating scan and transmission settings using an application running on the information processing apparatus. However, this method remains unchanged from conventional methods in that a user needs to perform a setting operation on the operation panel of a digital multifunction peripheral; therefore, a user cannot always create settings in a short time, fully exploiting the functions of a digital multifunction peripheral.

The method described in Japanese Patent Laid-Open No. 2006-120041 provides operability, i.e., printing is performed by an operation of dragging and dropping a document data icon onto a print settings icon. This is an effective measure to allow a user to be freed from creating complicated settings. However, this is not sufficiently applicable to the case of scanning and transmission using a digital multifunction peripheral where there is originally no document to be processed, such as in the case of printing and, besides, the setting of a destination to which data is transmitted is necessary.

SUMMARY OF THE INVENTION

The present invention provides an information processing apparatus, an image input apparatus, a document distribution system, and a control method therefor. As a result of associating existing document data with an image input apparatus, such as a digital multifunction peripheral, by operating an application running on a client computer, the information processing apparatus can register, by a simple operation, the storage location of scan data and scan settings with the image input apparatus.

It is desirable for the present invention to have the following configuration.

The present invention according to a first aspect provides an information processing apparatus for creating scan and transmission settings for an image input apparatus with which scan and transmission settings can be registered. The information processing apparatus comprises: an association unit configured to associate existing document data with an image input apparatus for which scan and transmission settings are to be created; an extraction unit configured to extract scan settings from the existing document data associated with the image input apparatus; a setting unit configured to set a location in a storage where the existing document data has been stored as a storage location of scan data to be provided by the image input apparatus as a result of a scanning operation; and a transmission unit configured to transmit the extracted scan settings and the set storage location to the image input apparatus as scan and transmission settings that are to be registered with the image input apparatus.

The present invention according to a second aspect provides an information processing apparatus for registering transmission settings for a scanning and transmitting function with an image input apparatus having the scanning and transmitting function. The information processing apparatus comprises: a specification unit configured to specify document data for which transmission settings are to be made; an acquisition unit configured to acquire information regarding a location where the document data specified by the specification unit has been stored, wherein the location where the document data has been stored is either a storage area within a memory unit of the information processing apparatus or a storage area within an external memory unit accessible by the information processing apparatus; a setting unit configured to set the location acquired by the acquisition unit as a storage destination of scan data to be produced by the image input apparatus as a result of a scanning operation; and a transmission unit configured to transmit the storage destination set by the setting unit to the image input apparatus as the transmission settings that are to be registered with the image input apparatus.

The present invention according to a third aspect provides an image input apparatus for receiving scan and transmission settings from an information processing apparatus. The image input apparatus comprises: a user interface unit; a display unit configured to receive scan and transmission settings including scan settings and a storage location of scan data, and to display, using the user interface unit, an operation unit corresponding to the scan and transmission settings; and a scan and transmission unit, configured to, upon operation of the operation unit, scan a document according to the scan settings and store the scanned document as scan data in the storage location.

The present invention according to a fourth aspect provides a control method for an information processing apparatus that is for creating scan and transmission settings for an image input apparatus with which scan and transmission settings can be registered. The control method comprises: associating existing document data with an image input apparatus for which scan and transmission settings are to be created; extracting scan settings from the existing document data associated with the image input apparatus; setting a location in a storage unit where the existing document data has been stored as a storage location of scan data; and transmitting the extracted scan settings and the set storage location to the image input apparatus as scan and transmission settings that are to be registered with the image input apparatus.

The present invention according to a fifth aspect provides a control method for an information processing apparatus that is configured to register transmission settings for a scanning and transmitting function with an image input apparatus having the scanning and transmitting function. The control method comprises: specifying document data for which transmission settings are to be created; acquiring a location where the document data specified in the specification step has been stored, the location where the document data has been stored being either a storage area within a memory unit of the information processing apparatus or a storage area within an external memory unit accessible by the information processing apparatus; setting the location acquired in the acquisition step as a storage destination of scan data; and transmitting the storage destination set in the setting step to the image input apparatus as transmission settings that are to be registered by the image input apparatus.

The present invention according to a sixth aspect provides a control method for an image input apparatus that is for receiving scan and transmission settings from an information processing apparatus. The control method comprises: receiving scan and transmission settings including scan settings and a storage location of scan data and displaying an operation unit corresponding to the scan and transmission settings using a user interface; and scanning, upon operation of the operation unit, a document according to the scan settings and storing the scanned document as scan data in the storage location.

Further features of the present invention will become apparent from the following description of exemplary embodiments with reference to the attached drawings.

DESCRIPTION OF THE EMBODIMENTS

First Exemplary Embodiment

Hereinafter, preferable embodiments of the present invention will be described with reference to the drawings. First, a first exemplary embodiment of the present invention is described with reference to FIGS. 1 to 10.

System Configuration

Figure 1:
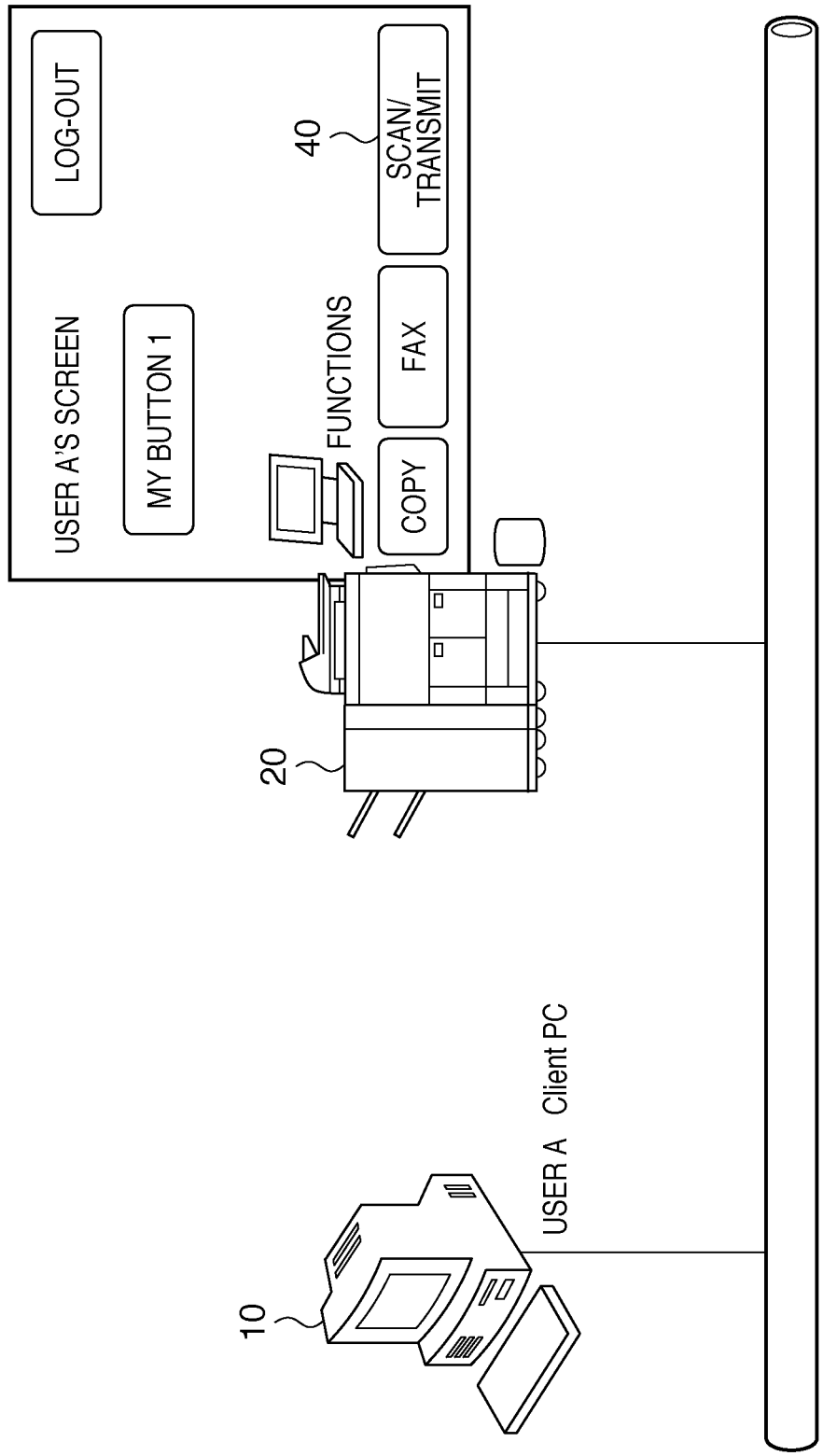
FIG. 1 is a conceptual system diagram of a document distribution system according to a first exemplary embodiment of the present invention.

FIG. 1 is a conceptual system diagram of a document distribution system according to an exemplary embodiment of the present invention. In the document distribution system according to the present exemplary embodiment, a client computer 10, having installed therein a client application exclusive to the document distribution system of the present exemplary embodiment, and a digital multifunction peripheral 20, having copy, print, scanner, and FAX functions, are connected through a network. Although not shown, in addition to the client computer 10, other computers that can be a destination to which documents are distributed are also connected to the network. A user A accesses the document distribution system via a client application performed by the client computer 10. Here, the document distribution system according to the present exemplary embodiment is configured to be accessed by the user A via a special-purpose client application; however, the configuration may be such that a general-purpose application, e.g., a browser, is installed on the client computer 10 and is operated by a user. The digital multifunction peripheral 20 allows a scan and transmit button 40 to be preset and registered remotely. Such a presetting and registration operation can be remotely performed through communication with, for example, a computer. The document distribution system according to the present exemplary embodiment will be described in the case of using the digital multifunction peripheral 20 as an image forming apparatus. It may also use any other image forming apparatus such as a consumer scanner or the like. Furthermore, the document distribution system according to the present exemplary embodiment may be configured to be implemented on a Web application server not shown and to communicate with a browser.

Hardware Configuration

Figure 2:
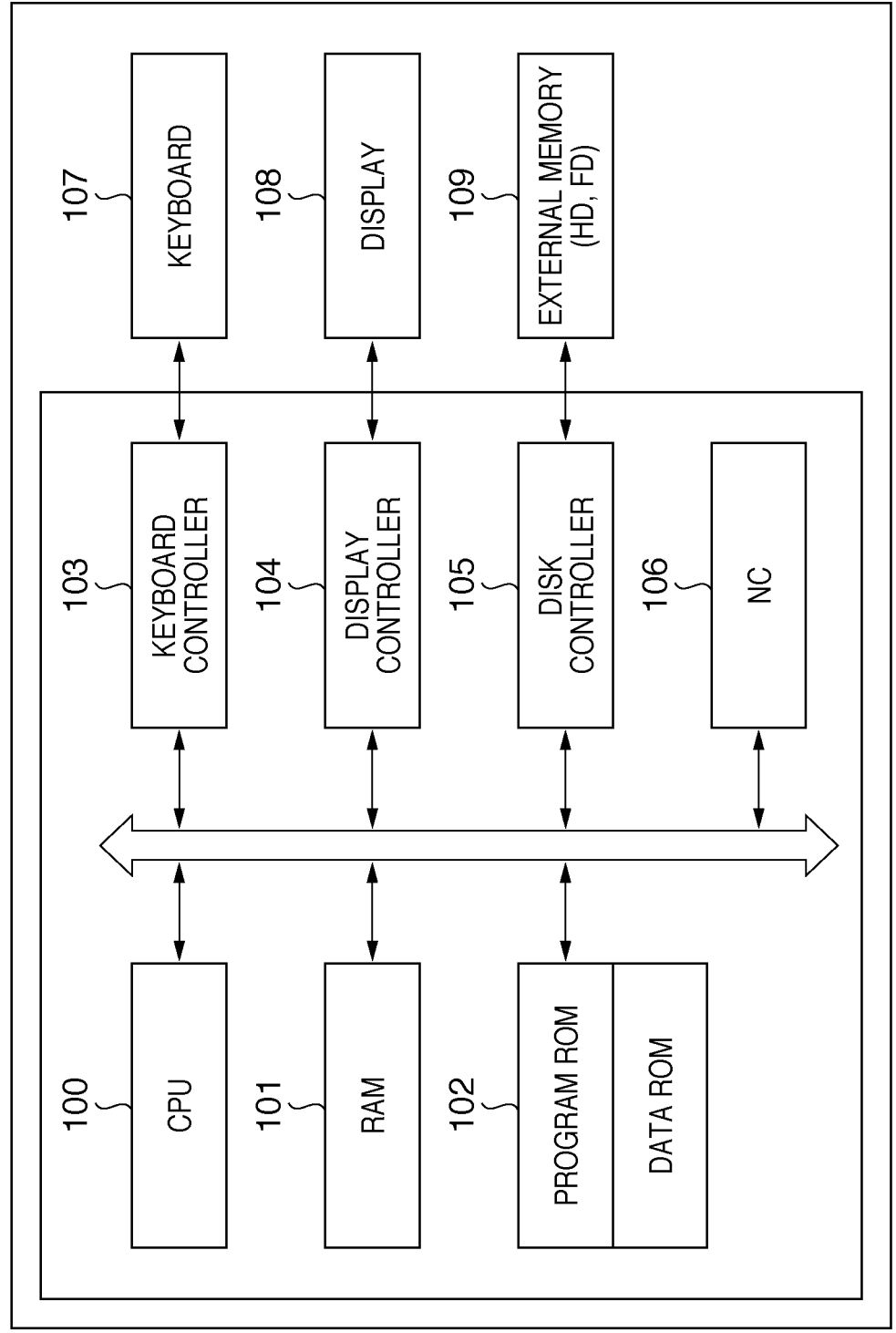
FIG. 2 is a hardware configuration diagram of a PC in the document distribution system according to the first exemplary embodiment of the present invention.

FIG. 2 is a hardware configuration diagram of each computer (PC) constituting the document distribution system according to the exemplary embodiment of the present invention. The hardware configuration diagram shown in FIG. 2 is considered to be equivalent to a hardware configuration diagram of a general information processing apparatus, so that the hardware configuration of a general information processing apparatus is applicable to each PC of the present exemplary embodiment.

In FIG. 2, a CPU 100 performs a program, such as an OS, an application, or the like, that has been stored in a program ROM of a ROM 102 or that has been loaded from a hard disk 109 to a RAM 101. The term "OS" as used herein is an abbreviation for an operating system that is running on a computer, and such an operating system is hereinafter referred to as an "OS." The processing shown in the flow charts described later is implemented by execution of this program performed by the CPU 100. The RAM 101 serves as a main memory, a work area, or the like of the CPU 100. A keyboard controller 103 controls key input from a keyboard 107 or a pointing device, not shown. A display controller 104 controls display on a variety of displays 108. A disk controller 105 controls data access to or from a disk, such as a hard disk (HD) 109, a flexible disk (FD), or the like, that stores a variety of data. A network controller (NC) 106 is connected to the network and performs communication control processing for controlling communications with other equipment connected to the network.

Figure 3:
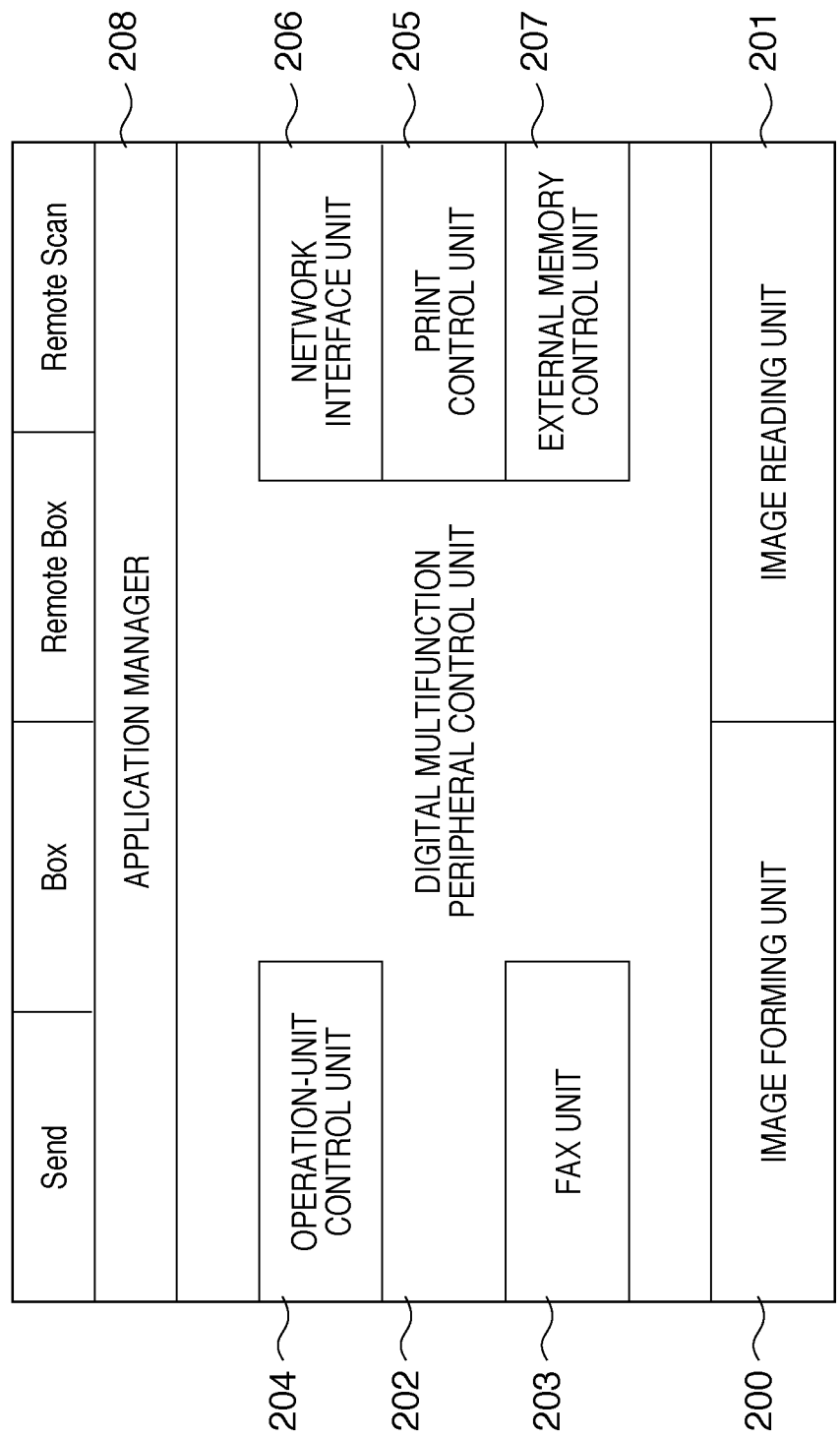
FIG. 3 is a hardware configuration diagram of a digital multifunction peripheral in the document distribution system according to the first exemplary embodiment of the present invention.

FIG. 3 shows the hierarchical configuration of a digital multifunction peripheral according to the exemplary embodiment of the present invention. In FIG. 3, an image-forming unit 200 performs a series of image forming processes, such as paper handling, image transfer and fixing (duplicating), and the like, and forms an image on a recording medium such as recording paper. This image-forming unit 200 includes, for example, an inkjet printer or an electrophotographic image-forming device. An image-reading unit 201 including a scanner or the like optically reads an original image and converts the image into digital image information. The obtained digital image information may be input into the image-forming unit 200 so as to form an image, or may be passed to other units such as a FAX unit 203 or a network interface unit 206 and transmitted to other apparatuses through a line.

A digital multifunction peripheral control unit 202 controls the operations of the image-forming unit 200 and the image-reading unit 201, for example, in such a manner that original information read by the image-reading unit 201 is duplicated by the image-forming unit 200. The digital multifunction peripheral control unit 202 includes the network interface unit 206, a print control unit 205, the FAX unit 203, and an operation-unit control unit 204, and controls even the exchange of information between those units. The FAX unit 203 can perform processing, such as transmitting and receiving a facsimile image, i.e., transmitting digital image information read by the image-reading unit 201 or decoding the received facsimile signal and recording the decoded signal in the image-forming unit 200. Under the control of the operation-unit control unit 204, a signal is generated in accordance with a user operation using a control panel of an operation unit, and a variety of data or messages are displayed on a display unit or the like of the operation unit. Under the control of the print control unit 205, for example, print data received via the network interface unit 206 is processed and output to and printed by the image-forming unit 200 for printing. The network interface unit 206 controls data transmission and reception between the apparatus and other communication terminals through communication lines.

An external memory control unit 207 is capable of storing, in an external memory (not shown), image data that has been read by the image-reading unit 201 and converted to a data format storable in the external memory by the image-forming unit 200. The external memory control unit 207 is also capable of reading out data stored in an external memory, performing print processing via the image forming unit 200, transmitting data to an external device via the network through the network interface unit 206, and the like.

An application manager 208 manages applications such as copying, scanning, and the like. The application manager 208 controls each application by accepting activation, termination, installation, and uninstallation of each application or receiving equipment information generated by the digital multifunction peripheral control unit.

Software Configuration

Figure 4:
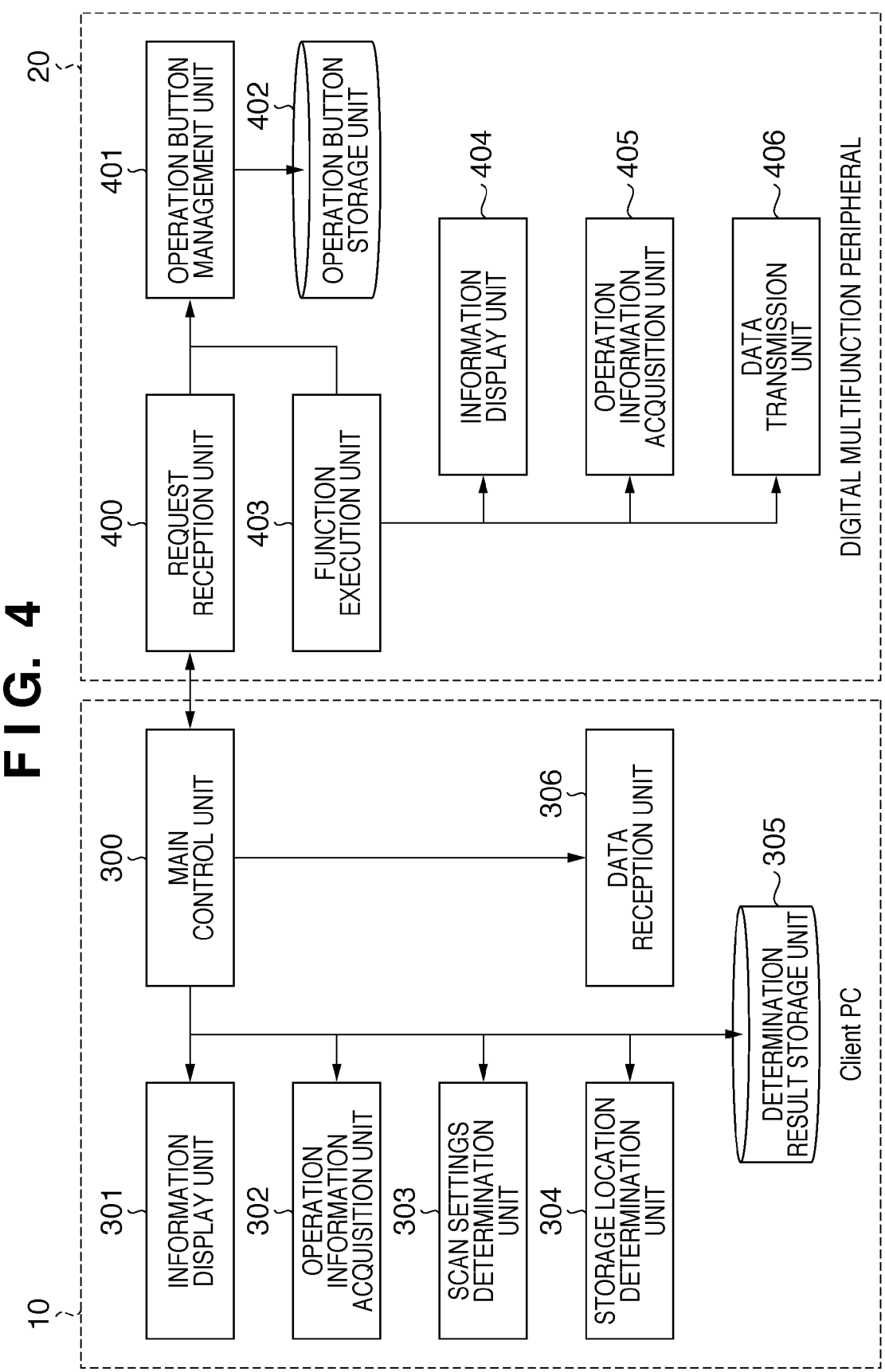
FIG. 4 is a software configuration diagram showing an example of the document distribution system according to the first exemplary embodiment of the present invention.

FIG. 4 is a software configuration diagram showing an example of the document distribution system according to the exemplary embodiment of the present invention. It shows the software configurations of the client computer 10 and the digital multifunction peripheral 20.

First, the software configuration diagram of the client computer 10 is described. A main control unit 300 controls a client application in the document distribution system according to the exemplary embodiment of the present invention, and instructs and manages each unit described later. An information display unit 301 displays, in accordance with an instruction from the main control unit 300, a user interface of the client application on the client computer 10. An operation information acquisition unit 302 acquires information manipulated by a user via the user interface of the client application displayed by the information display unit 301 and notifies the main control unit 300 of the acquired information. A scan settings determination unit 303 determines scan settings for use as scan and transmission information from the document selected by a user. A storage location determination unit 304 determines a storage location for use as scan and transmission information according to repository information displayed in, for example, a tree view by the information display unit 301. A determination result storage unit 305 stores the scan settings determined by the scan settings determination unit 303 and storage location information indicating the storage location determined by the storage location determination unit 304. A data reception unit 306 receives document data scanned by and transmitted from the digital multifunction peripheral 20 and notifies the main control unit 300 of the received document data.

Figure 5:
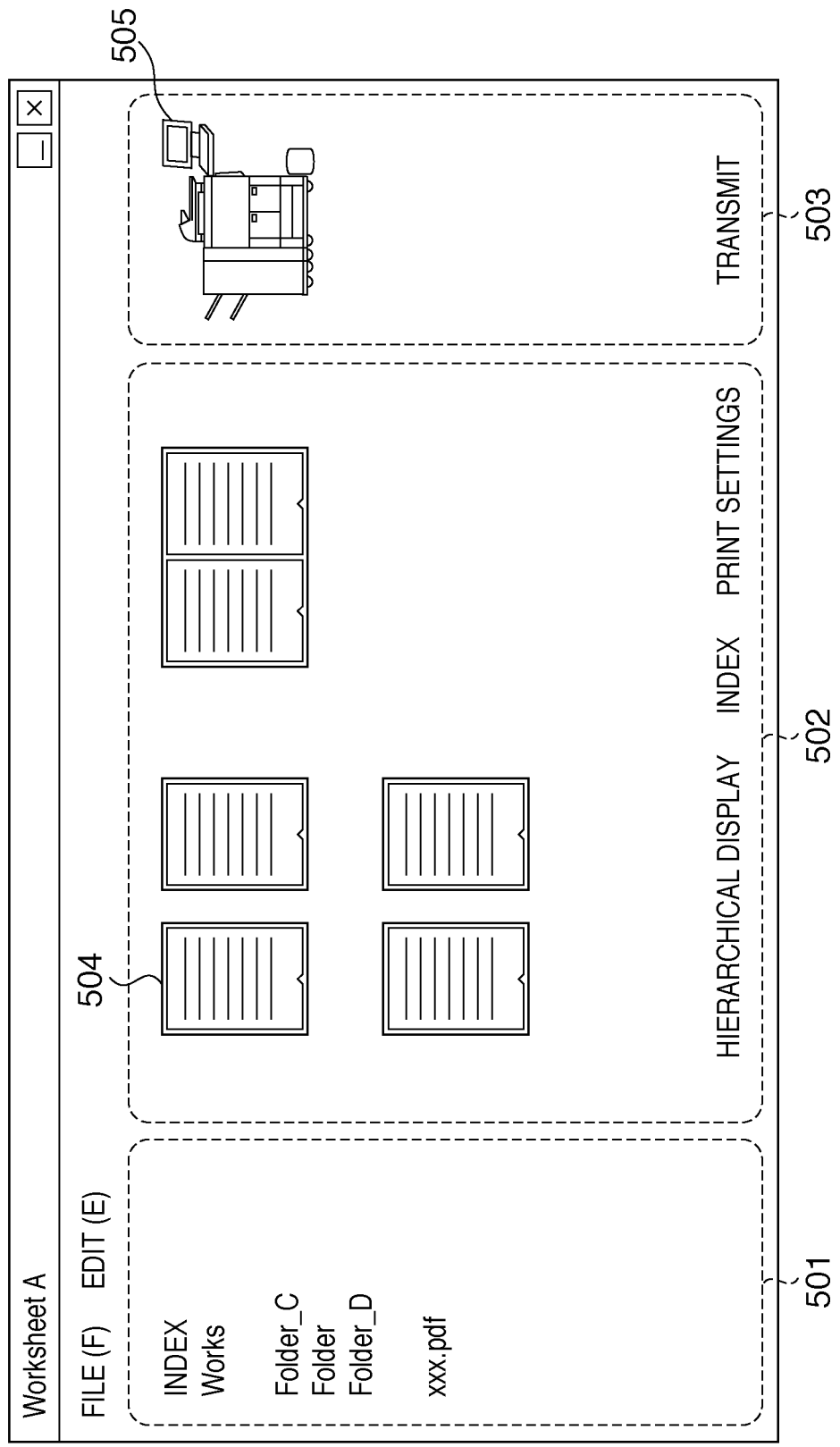
FIG. 5 shows an exemplary user interface of a client application in the document distribution system according to the first exemplary embodiment of the present invention.

FIG. 5 shows an exemplary user interface (UI) of the client application displayed by the information display unit 301. The UI is configured to have an area 501 for displaying repository information such as a tree view, a document listing area 502 for displaying document data 504 as a thumbnail or an icon, and a peripherals listing area 503 for displaying information about peripherals, such as digital multifunction peripherals. A user registers a scan and transmit button with the digital multifunction peripheral 20 by operating the user interface of the client application. Note that the form and area configuration of the user interface of the client application shown in FIG. 5 and a control method therefor are not limited to the example described above, and the user interface may be in any form as long as necessary functions can be implemented. For example, the document listing area 502 and the peripherals listing area 503 may display, instead of thumbnails or icons, a listing of filenames for specifying documents or peripherals, or a listing of character strings, such as device names.

Next, the software configuration diagram of the digital multifunction peripheral 20 is described with reference to FIG. 4. A request reception unit 400 receives, in accordance with a user instruction, a request to register a scan and transmit button from the main control unit 300 of the client computer 10 and notifies the main control unit 300 of the result of processing performed in response to the registration request. An operation button management unit 401 registers the scan and transmit button with an operation button storage unit 402 or extracts and edits information about the scan and transmit button. The operation button storage unit 402 stores information about scan and transmit buttons. A function execution unit 403 controls execution of the functions of the digital multifunction peripheral 20 in the document distribution system according to the exemplary embodiment of the present invention and instructs and manages each unit described. An information display unit 404 displays, in accordance with an instruction from the function execution unit 403, a user interface in the operation unit of the digital multifunction peripheral 20. An operation information acquisition unit 405 acquires information manipulated by a user via the user interface of the digital multifunction peripheral 20 displayed by the information display unit 404 and notifies the function execution unit 403 of the acquired information. A data transmission unit 406 transmits, to the data reception unit 306 of the client computer 10, document data scanned by the digital multifunction peripheral 20 in accordance with a user instruction.

Hereinafter, the processing in each step in the document distribution system according to the first exemplary embodiment of the present invention is described in detail with reference to FIGS. 6 to 10.

Scan/Transmit Button Registration Processing

Figure 6:
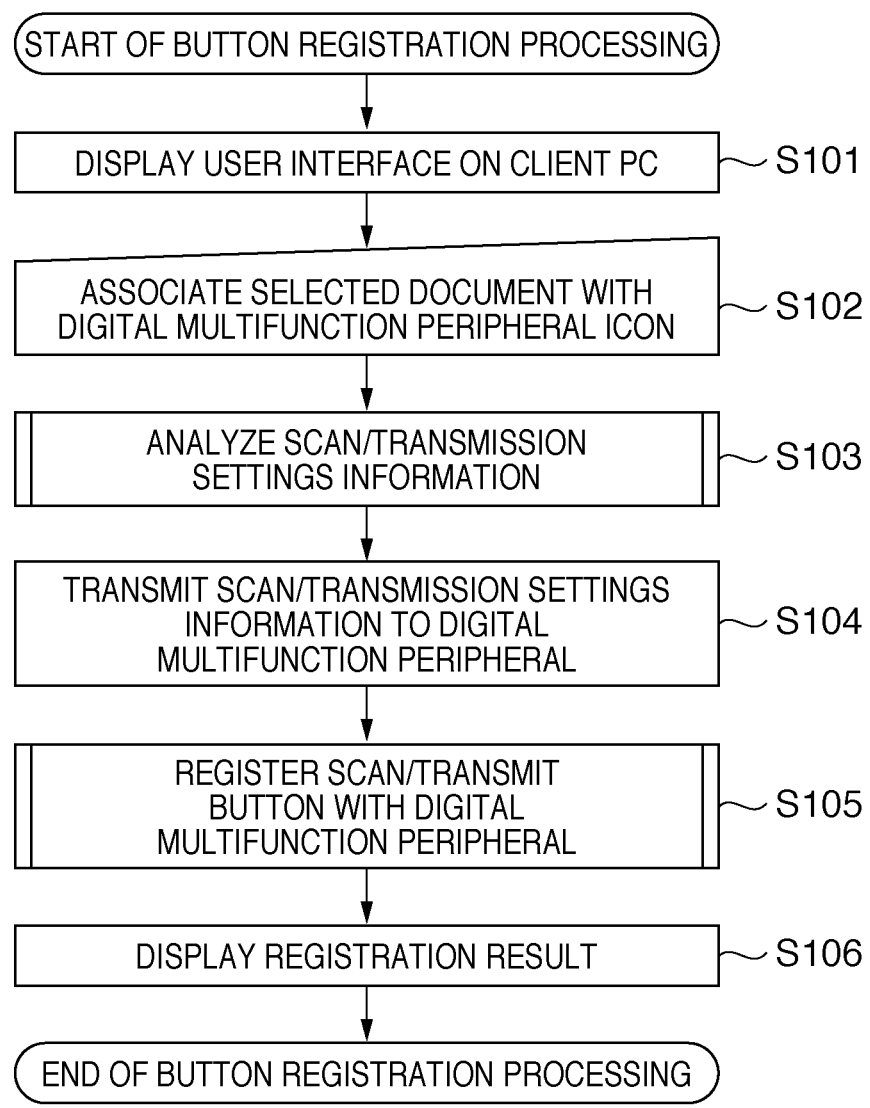
FIG. 6 is a flow chart showing the outline of a procedure in the process of registering a scan and transmit button in the document distribution system according to the first exemplary embodiment of the present invention.

A user A can register a scan and transmit button with the digital multifunction peripheral 20 via the client application installed on the client computer 10 in the document distribution system according to the exemplary embodiment of the present invention. FIG. 6 is a flow chart showing the outline of a procedure for scan/transmit button registration processing. The procedure is described below with reference to FIGS. 1 to 6. The steps in the procedure shown in FIG. 6, except step S105, are performed by the client computer 10. Step S105 is performed by the digital multifunction peripheral 20 that has received scan and transmission settings information.

The client application in the document distribution system according to the exemplary embodiment of the present invention is activated upon a user instruction. Upon activation, in step S101, the main control unit 300 instructs the information display unit 301 to display the user interface of the client application on the display 108 of the client computer 10. At this time, the main control unit 300 displays, in the document listing area 502, document data pieces in the folder selected by the user from the area 501 for displaying repository information in, for example, a tree view. Also, the main control unit 300 acquires information about peripherals, such as the digital multifunction peripheral 20, that are operable by the client application, and displays the acquired information in the peripherals listing area 503.

Then, in step S102, a user operation for selecting and associating a document data piece 504 and a digital multifunction peripheral 505 is accepted via the user interface displayed on the display 108 in step S101. Upon accepting the selection and association operation, the information acquisition unit 302 transmits, to the main control unit 300, a notification indicating which document data and digital multifunction peripheral were selected and that association processing will be performed. Note that the term "association" as used herein refers to linking target data pieces to each other in order to make them identifiable; it can be implemented, for example, by adding information for identifying an associated data piece to data or by arranging data pieces in such a form that makes them identifiable.

Then, in step S103, upon accepting the user instruction to perform an association operation in step S102, the main control unit 300 instructs the scan settings determination unit 303 and the storage location determination unit 304 to analyze scan settings and storage location information indicating storage locations. Note that the scan settings and the storage location information indicating storage locations are hereinafter collectively referred to as "scan and transmission settings information." The scan settings determination unit 303 and the storage location determination unit 304 respectively store the determination results, namely the scan settings and the storage location information indicating storage locations, in the determination result storage unit 305.

Then, in step S104, upon acquiring the scan and transmission settings information analyzed in step S103 from the determination result storage unit 305, the main control unit 300 transmits the acquired scan and transmission settings information to the request reception unit 400 of the digital multifunction peripheral 20 and requests the registration of a scan and transmit button.

Then, in step S105, upon receiving the request to register a scan and transmit button in step S104, the request reception unit 400 of the digital multifunction peripheral 20 instructs the operation button management unit 401 to store the scan and transmit button in the operation button storage unit 402. The request reception unit 400 also notifies the main control unit 300 of the client computer 10 of the result of storage in the operation button storage unit 402.

In step S106, upon receiving the result of registration of the scan and transmit button notified by the request reception unit 400 in step S105, the main control unit 300 instructs the information display unit 301 to display the received registration result on the display 108 so as to notify the user A.

Analysis of Scan and Transmission Settings Information

Figure 7:
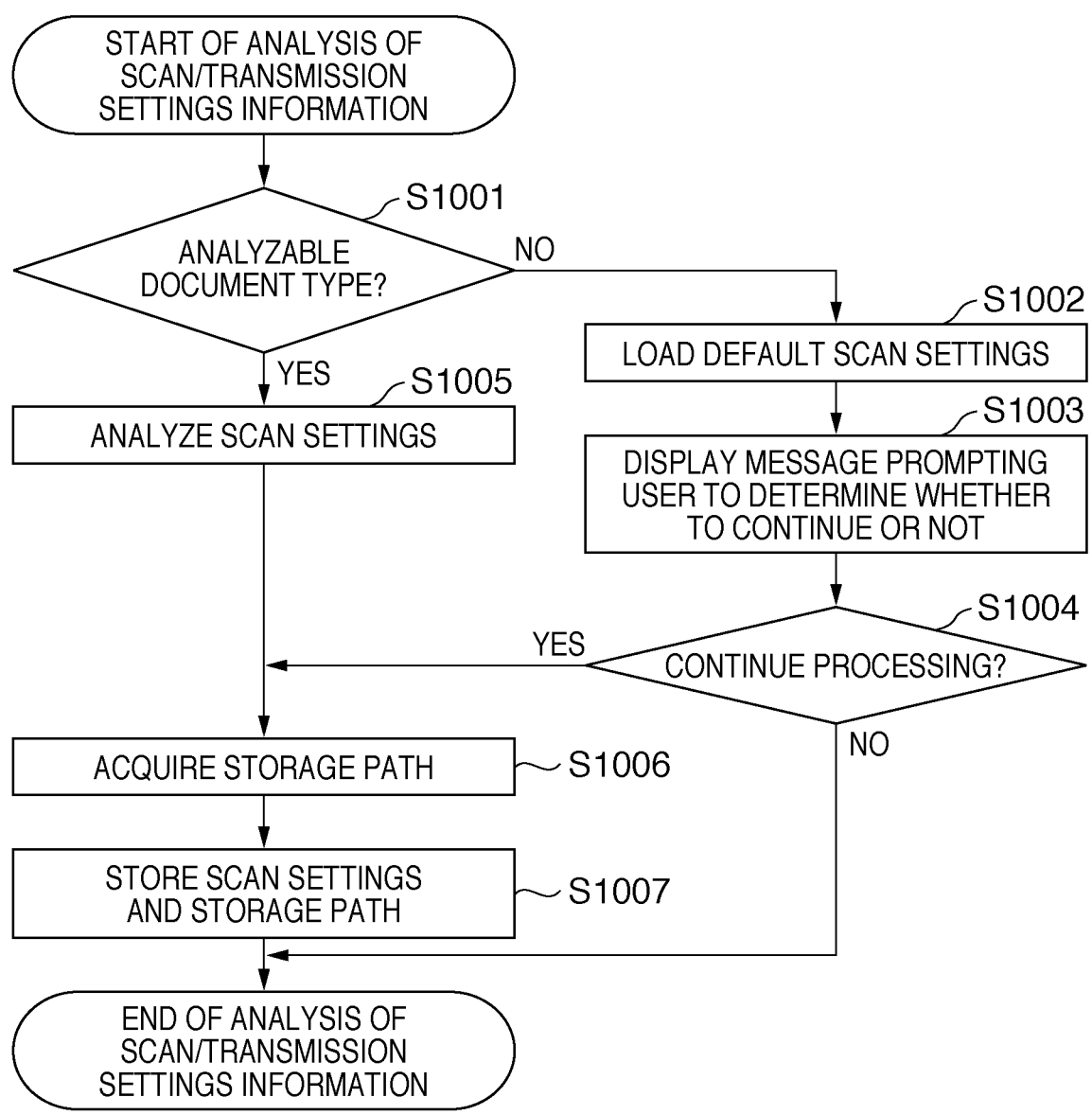
FIG. 7 is a flow chart showing a procedure in the process of analyzing scan and transmission settings information in the document distribution system according to the first exemplary embodiment of the present invention.

When a user performs an operation for associating document data piece 504 and a digital multifunction peripheral 505 via the UI in step S102, the analysis of the scan and transmission settings information is performed in step S103. FIG. 7 is a flow chart showing a procedure in the process of analyzing the scan and transmission settings information in step S103. The detail of the procedure is described below with reference to FIGS. 4 and 7.

In step S1001, upon receiving a user instruction to perform an association operation in step S102, the main control unit 300 instructs the scan settings determination unit 303 to determine whether the actual document corresponding to the document data piece 504 is of an analyzable document type or not. More specifically, in the case where analyzable file formats (e.g., TIFF, JPEG, PDF, etc.) have been set previously, the scan settings determination unit 303 may make the determination according to the extension of the document data piece. Alternatively, the scan settings determination unit 303 may determine whether the document data piece is analyzable or not by expanding the document data piece into a memory and then analyzing the header information of the document data piece, or may use any other method.

Then, when the data piece is determined as being of a document type that cannot be analyzed in step S1001, then in step S1002, the main control unit 300 loads default scan settings that have previously been stored in the determination result storage unit 305. Here, the default scan settings may be acquired from the digital multifunction peripheral 20 specified by the user association operation in step S102. In any case, the above example is not intended to limit the method of acquiring the default scan settings.

Then, in step S1003, the main control unit 300 instructs the information display unit 301 to display the determination result in step S1001 and the default scan settings acquired in step S1002 on the display 108 of the client computer 10. The default scan settings include settings such as the scan resolution, the color mode, the original size, the file format, and the like. Then, the main control unit 300 prompts the user to enter whether to continue the processing or not in step S1004, accepts the user input in response to the prompt, and determines the input value.

When it has been determined in step S1001 that the data piece is of an analyzable document type, then in step S1005, the scan settings determination unit 303 extracts information for use as scan settings from the document data. Specifically, the scan settings determination unit 303 analyzes settings included in the document data, such as the resolution, the color mode, the original size, the file format, and the like. As a result of the analysis, in step S1007, settings information included in the document data and determined as being scan settings is stored as scan settings in the determination result storage unit 305. Furthermore, if the document data piece is in PDF format, more detailed scan settings can be obtained by determining the presence or absence of settings such as page rotation information, OCR text embedding, encryption, and the like and, if such settings are present, by fetching those settings into the scan settings. Note that the information analyzed as the scan settings is not limited to the information described above; it is also possible, according to the document type of the document data piece, to analyze any other information that can be used as scan settings. In this way, the scan settings are extracted using the selected document data piece as model data.

Following step S1005 (or S1002, S103 and S1004), in step S1006, upon receiving the user instruction to perform an association operation in step S102, the main control unit 300 instructs the storage location determination unit 304 to acquire a path to the location where the document data corresponding to the document data piece 504 has been stored. Here, the document data may be stored in the external memory 109 of the client computer 10. Or, the document data may be stored in a shared folder on a file server (not shown) connected to the client computer 10 through the network. When the document data is stored in the external memory 109 of the client computer 10, the path to the location where the document data piece has been stored is a path including a host name on the network of the client computer 10. Also, when the document is stored in a shared folder on a file server, the path to the location where the document data piece has been stored is a network path of the shared folder. In any case, the locations of document data pieces are identifiable by the client computer 10. Note that, in the case where the path to the location where the document data piece has been stored can be neither directly referred to nor read or written by the digital multifunction peripheral 20, the scanned document may be exchanged between the client computer 10 and the digital multifunction peripheral 20 via a protocol such as FTP. Here, the "scanned document" refers to document data obtained by scanning an original such as paper; it may be image data, or character-recognized text data, or document data obtained by formatting such text data. In that case, a monitor program, not shown, may be activated and the scanned document may automatically be shifted to the location where the document data piece has been stored. Moreover, in the case where authentication information is necessary during these process steps, user information may also be acquired as a single piece of information about a storage path.

Then, in step S1007, the main control unit 300 stores the scan settings analyzed in step S1002 or S1005 (as mentioned above) and the storage path, i.e., the location information, acquired in step S1006 in the determination result storage unit 305.

Registration of Scan/Transmit Button with Digital Multifunction Peripheral

Figure 8:
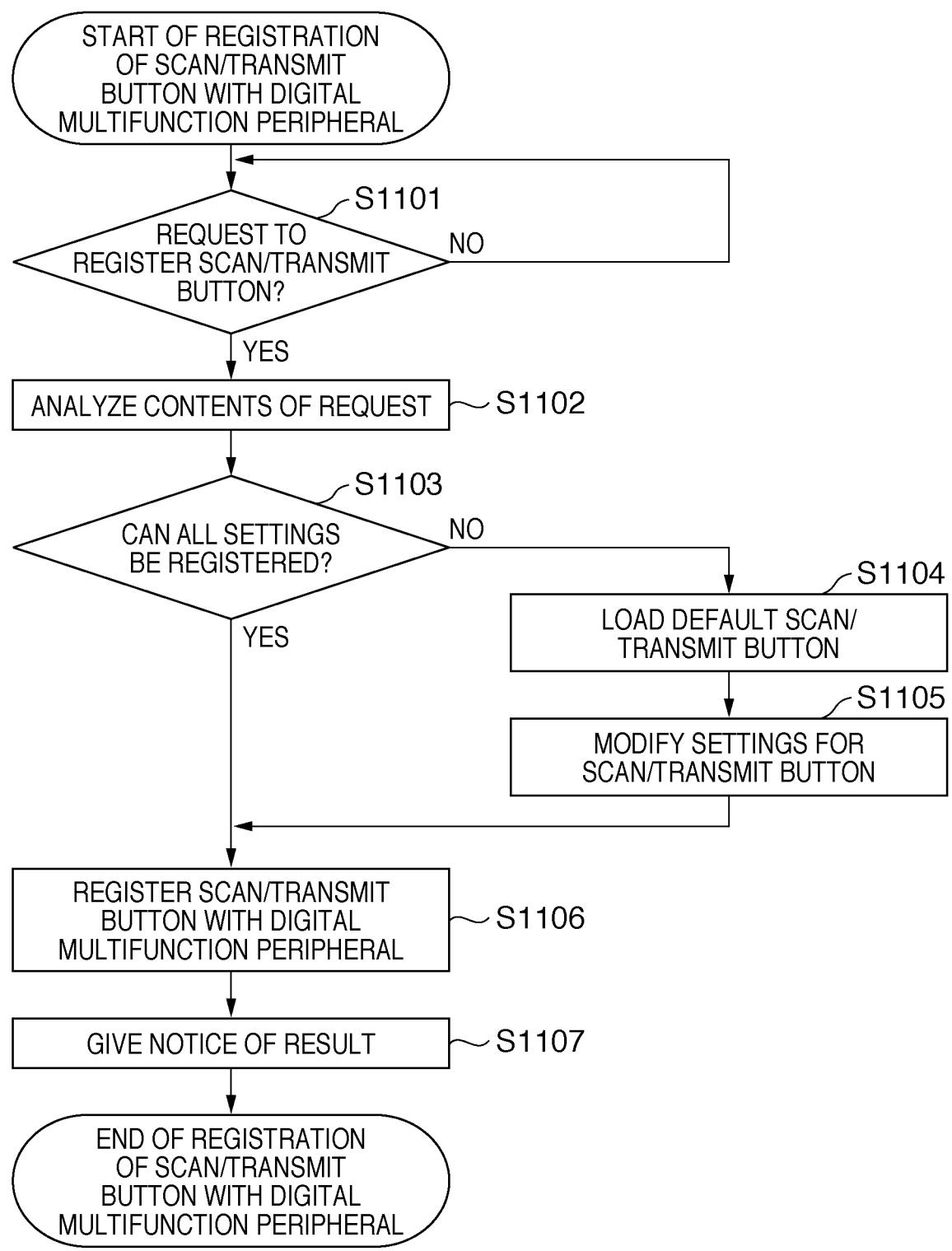
FIG. 8 is a flow chart showing a procedure in the process of registering a scan and transmit button with a digital multifunction peripheral in the document distribution system according to the first exemplary embodiment of the present invention.

When, in step S104, a request to register a scan and transmit button has been issued from the client application installed on the client computer 10 in the document distribution system according to the exemplary embodiment of the present invention, the scan and transmit button is registered with the digital multifunction peripheral 20. Upon receiving the request, the digital multifunction peripheral 20 performs the registration of the scan and transmit button in step S105. FIG. 8 is a flow chart showing a procedure in the process of registering a scan and transmit button with the digital multifunction peripheral 20 (step S105). The detail of the procedure shown is described with reference to FIGS. 4 and 8. The procedure shown in FIG. 8 is performed by the digital multifunction peripheral 20.

In step S1101, the request reception unit 400 determines whether or not the request received from the client application of the client computer 10 in step S104 is a request to register a scan and transmit button. If the procedure shown in FIG. 8 is performed upon a request to register a scan and transmit button, step S1101 can be omitted. Note that the loop shown for the case where the request is determined as not being a request to register a scan and transmit button in step S1101 is just for convenience in the drawing and, in practice, any appropriate processing shall be performed before going into a standby mode for the next request.

Then, in step S1102, the operation button management unit 401 analyzes the request to register a scan and transmit button, received by the request reception unit 400. In step S1103, it is determined, according to the result in step S1102, whether or not the contents of the request to register a scan and transmit button, i.e., the received scan settings, can be registered without any modifications with the digital multifunction peripheral 20. If any setting item that cannot be registered or any setting item that should be added is present, that setting item is specified. For example, in the case where the scan and transmit button has color settings but the digital multifunction peripheral 20 can scan only in monochrome, the settings for the scan and transmit button need to be modified. Also, not all scan and transmit buttons include all scan settings necessary to perform scanning with the digital multifunction peripheral 20.

Then, when it has been determined in step S1103 that the scan and transmit button of the registration request cannot be registered as-is, then in step S1104, the operation button management unit 401 loads the default scan and transmit button settings stored in the operation button storage unit 402.

Then, in step S1105, using the default scan and transmit button settings acquired in step S1104, the settings for the scan and transmit button specified by the registration request from the client computer 10 are modified, or another setting item is added to those settings. Here, modification or addition is necessary only for such a setting item that has been determined as being difficult to be set as-is with the digital multifunction peripheral 20 or whose addition has been determined as being necessary; thus, as to the other items that have been determined as being capable of being set as-is, the received scan settings are used as-is.

Then, in step S1106, the operation button management unit 401 stores the scan and transmit button and its relevant scan and transmission settings information (i.e., the scan settings and the storage location) in the operation button storage unit 402. By doing so, a new scan and transmit button is registered with the digital multifunction peripheral 20. The operation button management unit 401 also notifies the request reception unit 400 of the registration result. Here, the registration of a scan and transmit button may be performed for each user, or may be performed for each group, so as to allow users in the group to share the button, or may be performed so as to allow all users to share the button. On this account, user information for specifying the range of users allowed to use a button is added to scan and transmission settings information associated with each scan and transmit button. Then, when a user logs in to the digital multifunction peripheral 20, the user information about a scan and transmit button is referred to, and the scan and transmit button is displayed in the user interface only for a user who is allowed to use the button.

Then, in step S1107, the request reception unit 400 notifies the main control unit 300 of the client computer 10 of the result of the registration of the scan and transmit button obtained in step S1006. The registration result may indicate, for example, only whether the registration of a scan and transmit button in response to the registration request has succeeded or not; however, in consideration of the possibility that the settings may be modified or added, the registration result should preferably include the scan settings that have been actually registered with the digital multifunction peripheral 20.

Figure 9:
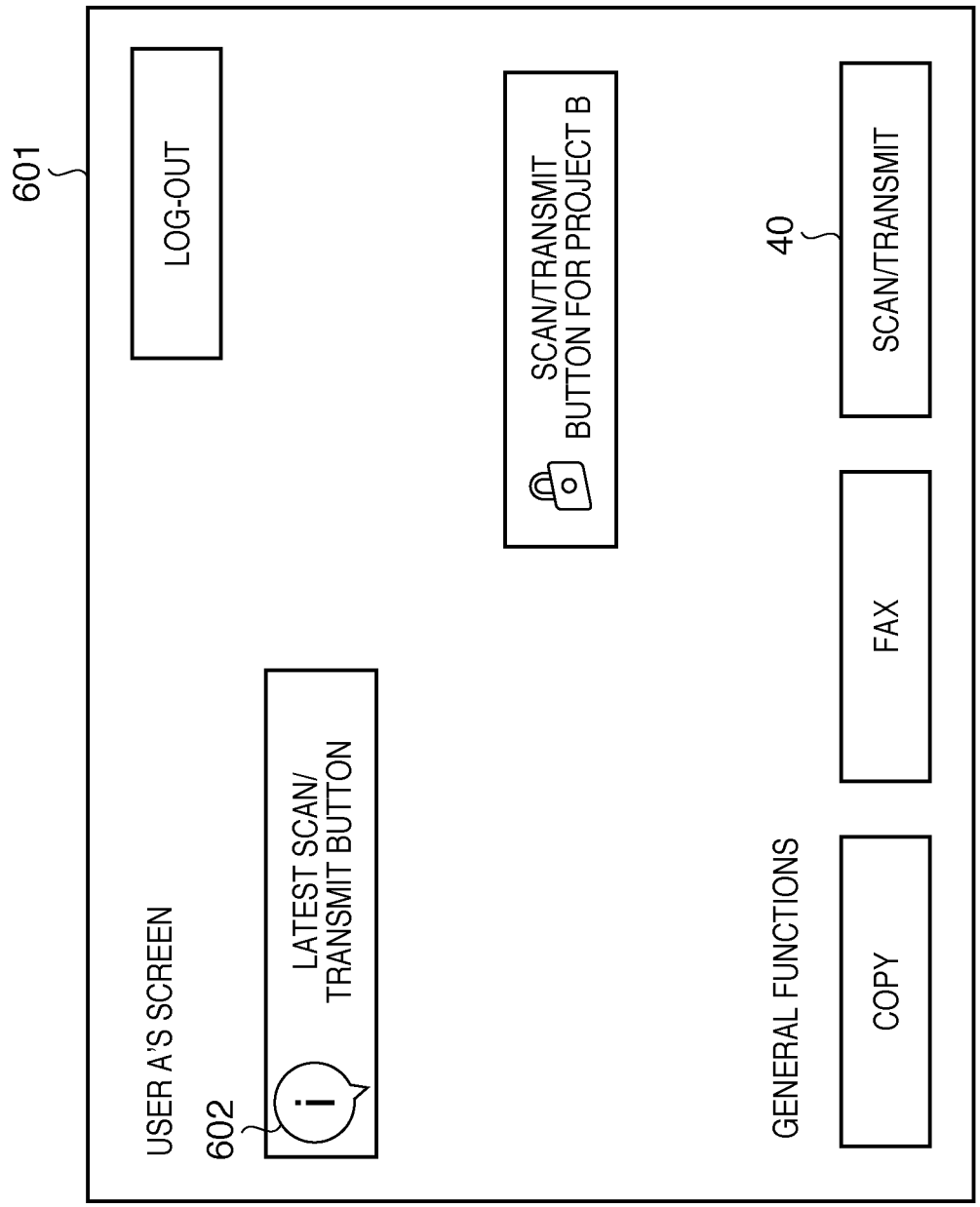
FIG. 9 shows an exemplary user interface displayed in an operation unit of a digital multifunction peripheral in the document distribution system according to the first exemplary embodiment of the present invention.

FIG. 9 shows an exemplary user interface displayed in the operation unit of the digital multifunction peripheral 20 in the document distribution system according to the exemplary embodiment of the present invention. When a user logs in to the digital multifunction peripheral 20, the operation unit of the digital multifunction peripheral 20 displays a local UI 601 and a registered scan and transmit button 602. Here, as previously described, only a scan and transmit button available for use by the logged-in user is displayed. Note that the form and configuration of the exemplary user interface shown in FIG. 9 and a control method therefor are not limited to the example described with FIG. 9. A browser, not shown, may operate in the operation unit of the digital multifunction peripheral 20 and the user interface may be generated by HTML.

Scan and Transmission Processing

Figure 10:
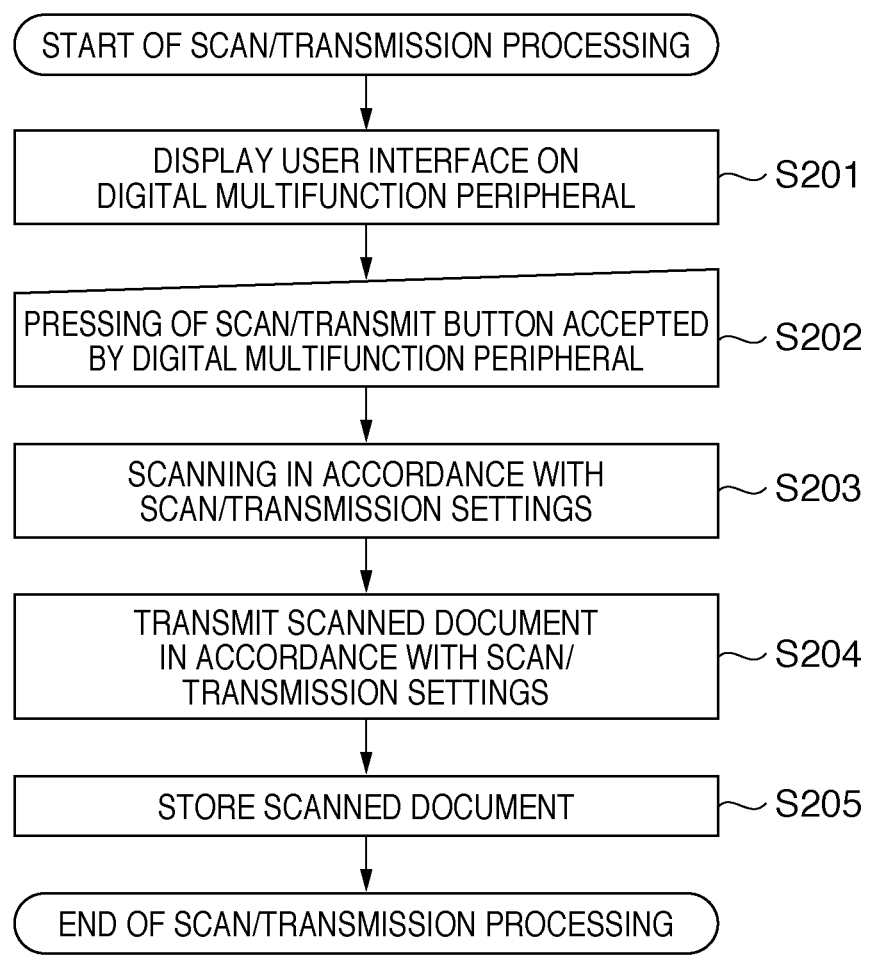
FIG. 10 is a flow chart showing a procedure for scan and transmission processing in the document distribution system according to the first exemplary embodiment of the present invention.

Upon an operation by a user A, such as touching the button 602 or the like, the digital multifunction peripheral 20 performs scanning and transmission. The client application in the document distribution system, which has been installed on the client computer 10 where the folder specified as a storage location of scan data (referred to as scanned document data) is present, receives and acquires document data from the digital multifunction peripheral 20. FIG. 10 is a flow chart showing a procedure for scan and transmission processing. The procedure is described below with reference to FIGS. 4 and 10. Steps S201 to S204 shown in FIG. 10 are performed by the digital multifunction peripheral 20. Step S205 is performed by a client computer to which document data is distributed, such as the client computer 10.

In step S201, when a user logs in to a digital multifunction peripheral 20 in a document distribution system, the function execution unit 403 acquires scan settings information stored in the operation button storage unit 402 via the operation button management unit 401. Of course, the information to be acquired is limited to the one available for use to the logged-in user. The function execution unit 403 instructs the information display unit 404 to display a user interface in which the scan and transmit button associated with the acquired scan settings information is located, in the operation unit of the digital multifunction peripheral 20.

Then, in step S202, the pressing of the scan and transmit button by the user is accepted via the user interface displayed on the digital multifunction peripheral 20 in step S201. The operation information acquisition unit 405 transmits a notification indicating that the scan and transmit button has been pressed, to the function execution unit 403.

Then, in step S203, upon accepting the pressing of the scan and transmit button by the user in step S202, the function execution unit 403 acquires the scan settings from the settings information corresponding to the pressed scan and transmit button. There is also the case where a plurality of scan and transmit buttons are present; therefore, the settings corresponding to the pressed button, from among the scan and transmit buttons stored in the operation button storage unit 402 via the operation button management unit 401, are searched for and acquired. In accordance with the acquired scan and transmit button settings information, the function execution unit 403 reads a paper original, not shown, via the image reading unit of the digital multifunction peripheral 20 so as to acquire scanned document data.

Then, in step S204, the function execution unit 403 instructs the data transmission unit 406 to transmit the scanned document data obtained in step S203 to the destination, namely, the storage location included in the settings information associated with the scan and transmit button.

Then, in step S205, the data reception unit 306 of the client computer 10 receives the scanned document data transmitted by the digital multifunction peripheral 20 in step S204. The client computer 10 stores the received scanned document data in a specified storage location (storage path). Here, as previously described, in the case where the specified storage path can be neither directly referred to nor read or written by the digital multifunction peripheral 20, the digital multifunction peripheral 20 may transmit the scanned document via a protocol, not shown, such as FTP. In that case, a monitor program not shown may be activated and the scanned document may automatically be shifted to the specified storage path.

As described above, the scan settings are acquired according to the attributes of existing document data, and the scan and transmission settings information using the acquired scan settings as its scan settings and the storage location of that document data as a destination to which scanned and transmitted data is transmitted, is transmitted to a scanner device, such as a digital multifunction peripheral. Upon receipt of the settings information, the scanner device displays, in the user interface, a newly operable operation button corresponding to the received scan settings information.

Second Exemplary Embodiment

A second exemplary embodiment of the present invention is described with reference to FIGS. 11 to 13. What makes the second exemplary embodiment different from the document distribution system of the first exemplary embodiment is that documents stored in a document management service 30 are browsed by operating the client application installed on the client computer 10 in the document distribution system according to the present exemplary embodiment. Furthermore, the document management service 30 can store document data scanned by and transmitted from the digital multifunction peripheral 20. Here, the document management service 30 stores documents in association with scan and transmission settings information for registering scan and transmit buttons 40 with the digital multifunction peripheral 20. This enables the client application to acquire the scan and transmission settings information from the document management service 30.

System Configuration

Figure 11:
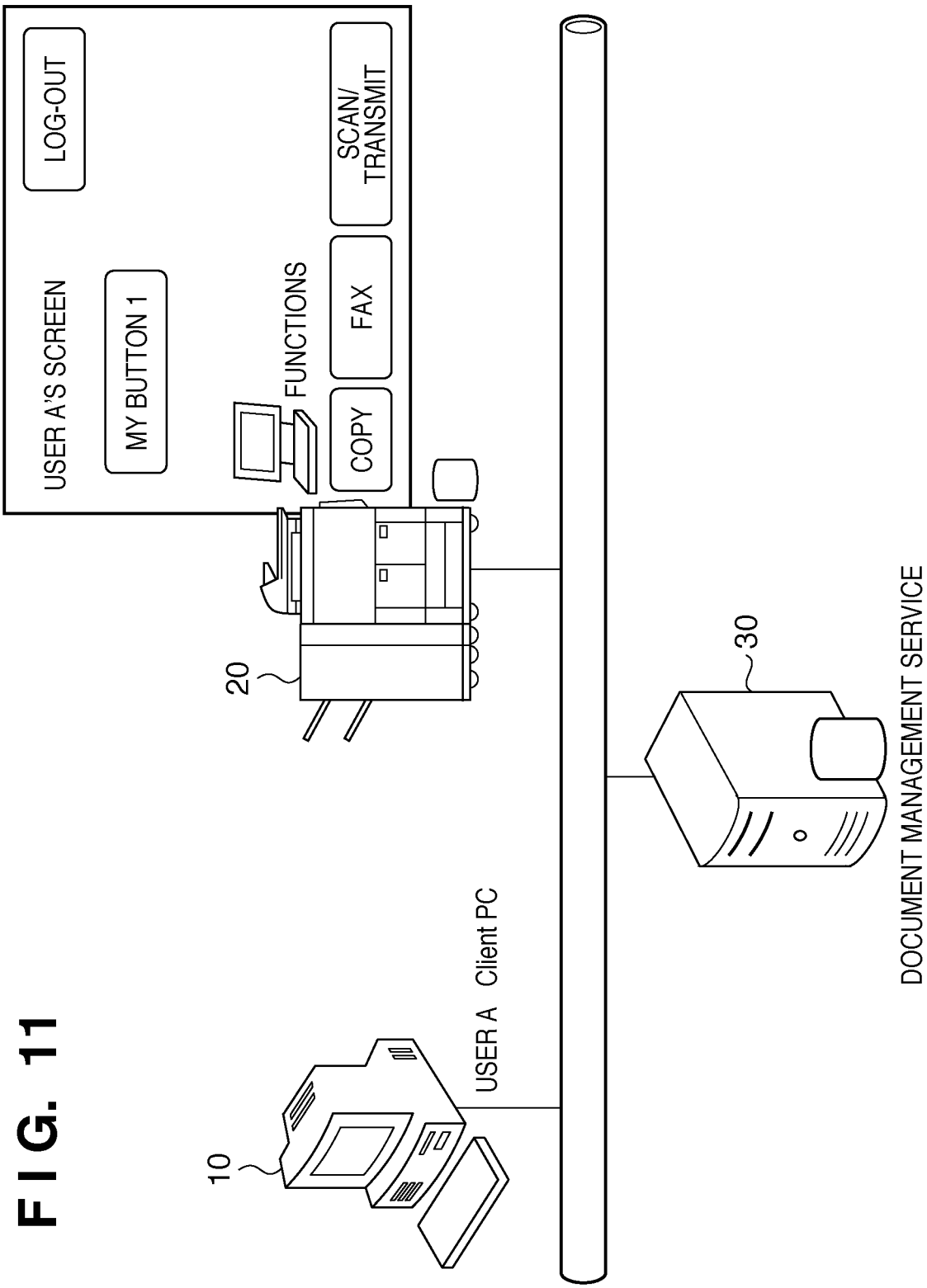
FIG. 11 is a conceptual system diagram of a document distribution system according to a second exemplary embodiment of the present invention.

FIG. 11 is a conceptual system diagram of a document distribution system according to the second exemplary embodiment of the present invention. The client computer 10 has installed therein a client application specifically designed for a user A to access the document distribution system according to the present exemplary embodiment. The document distribution system is constituted by this client computer 10, the digital multifunction peripheral 20 having copy, print, scanner, and FAX functions, and the document management service 30 that stores and manages documents, all of which are connected through a network. The document management service 30 is made available by a server implemented by a computer.

While in the configuration of the present exemplary embodiment, the client computer 10 and the document management service 30 are separate computers, though they may be constituted by a single PC. Furthermore, while the document distribution system according to the present exemplary embodiment is configured to be accessed by a user A via the special-purpose client application, the configuration may be such that a browser, not shown, is installed and run on the client computer 10, in which case the configuration may be such that the document distribution system according to the present exemplary embodiment is implemented on a Web application server, not shown, and communicates with the browser.

Software Configuration

Figure 12:
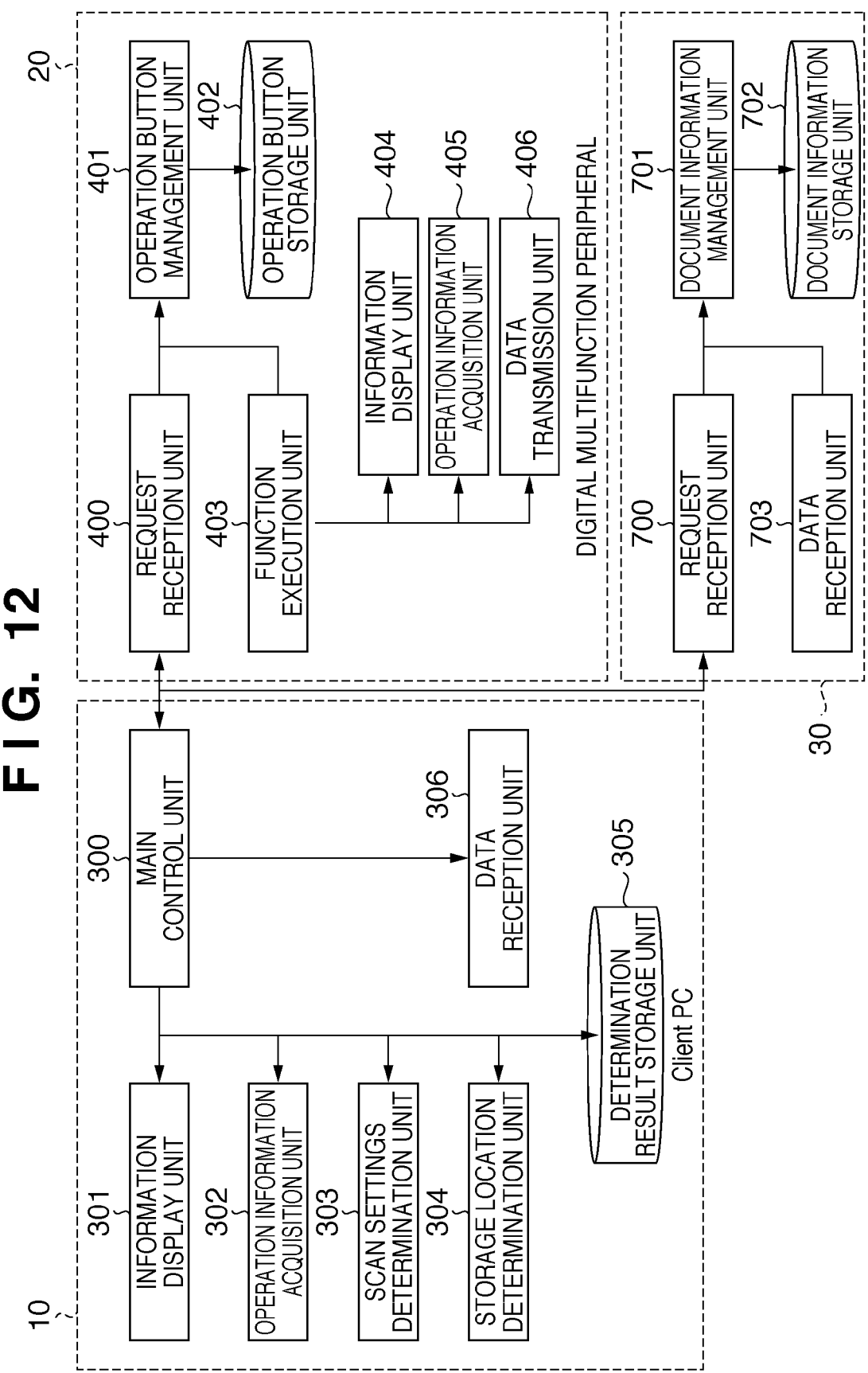
FIG. 12 is a software configuration diagram showing an example of the document distribution system according to the second exemplary embodiment of the present invention.
Figure 13:
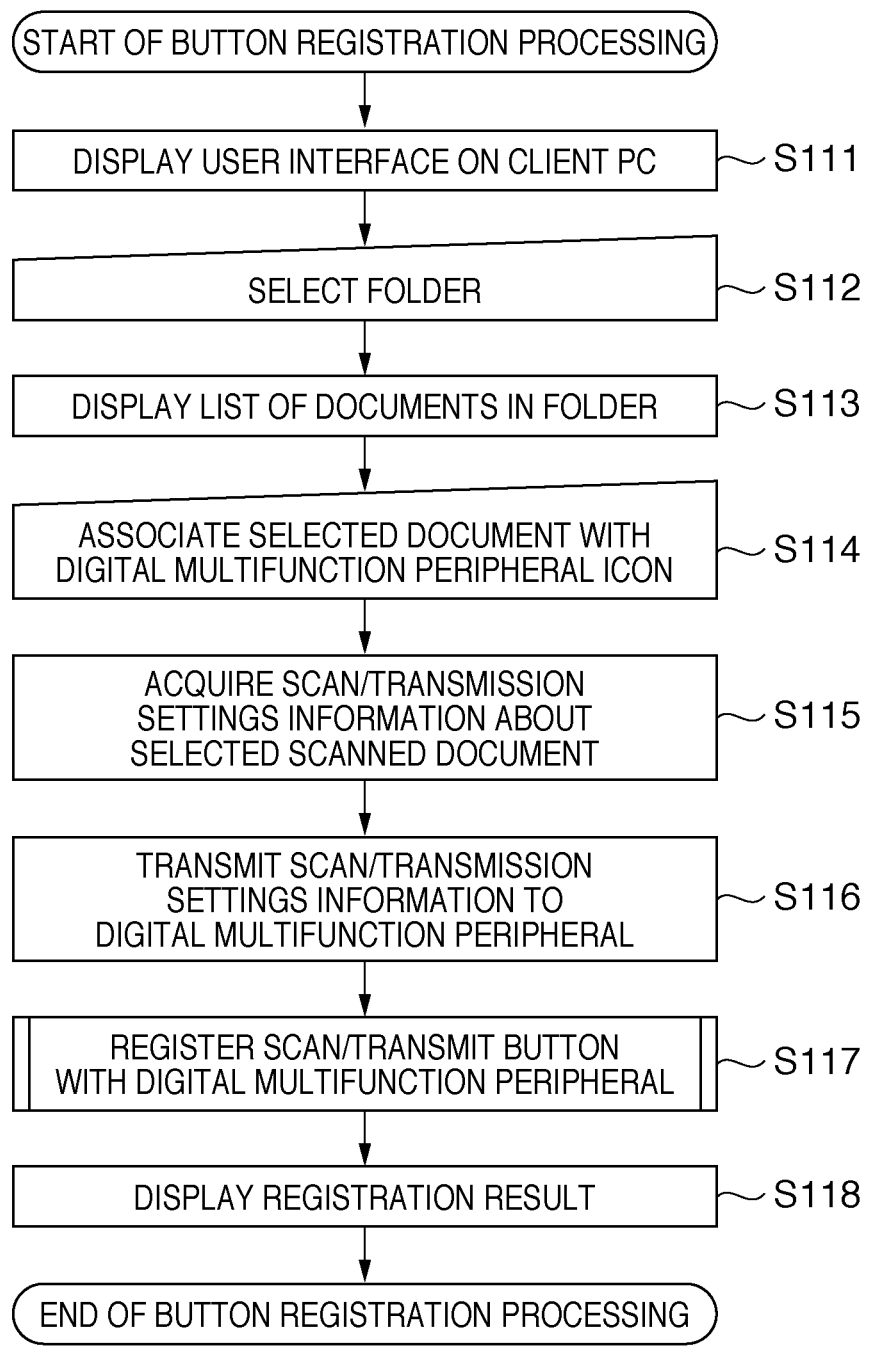
FIG. 13 is a flow chart showing the outline of a procedure in the process of registering a scan and transmit button in the document distribution system according to the second exemplary embodiment of the present invention.

FIG. 12 is a software configuration diagram showing an example of the document distribution system according to the exemplary embodiment of the present invention. It shows the software configurations of the client computer 10, the digital multifunction peripheral 20, and the document management service 30. This system differs from the document distribution system of the first exemplary embodiment in that the software configuration of the document management service 30 is added. This system also differs in that, in order to acquire a document data piece as model data for scan settings from the document management service 30, the document management service 30 becomes a destination to which the scanned document data is transmitted from the data transmission unit 406 of the digital multifunction peripheral 20. Of course, even in the configuration shown in FIG. 12, if a document data piece stored in the client computer 10 itself is used as model document data, the client computer 10 becomes a destination to which data is transmitted. Below, only the software configuration of the document management service 30 is described.

Upon the issuance of a user instruction, a request reception unit 700 receives a request to, for example, acquire folder information or document data from the main control unit 300 of the client computer 10, and notifies the main control unit 300 of the processing result for each request. A document information management unit 701 registers document data with a document information storage unit 702 or extracts and edits a folder and document data. The document information storage unit 702 stores document data. A data reception unit 703 receives the document data scanned by and transmitted from the digital multifunction peripheral 20 and notifies the document information management unit 701 to store the received data in the document information storage unit 702.

Here, when storing the document data scanned by and transmitted from the digital multifunction peripheral 20 in the document information storage unit 702, the operation performed by the digital multifunction peripheral 20 is stored in association with the document data. By doing so, scan and transmission settings information set by using this document data as model data can be reused in later steps. Note that the operation performed by the digital multifunction peripheral 20 includes scan setting, the setting of communication means with the document management service 30, and the like; it may also include any other information (such as a workflow) that can be used as scan and transmission settings information.

Moreover, the above example is not intended to limit the method of associating the document data stored in the document information storage unit 702 and the scan and transmission settings information. The scan and transmission settings information may be stored on a DB (database) table relative to document data, or may be stored in a file such as XML or the like, in which case a path to the file may be stored as the attributes of document data. The detail of the processing in each step in the document distribution system according to the second exemplary embodiment of the present invention is described below with reference to FIGS. 5 and 11 to 13.

Scan/Transmit button Registration Processing

A user A registers a scan and transmit button with the digital multifunction peripheral 20 via a client application of the client computer 10 in the document distribution system according to the exemplary embodiment of the present invention. FIG. 13 is a flow chart showing the outline of a procedure for scan/transmit button registration processing. The procedure is described below with reference to FIGS. 5 and 11 to 13.

The client application is activated in accordance with a user instruction. Upon activation, in step S111, the main control unit 300 instructs the information display unit 301 to display the user interface of the client application on the display 108 of the client computer 10.

Then, in step S112, the information acquisition unit 302 accepts a user operation for selecting a folder within the document management service 30 via the user interface displayed on the display 108 in step S111. The information acquisition unit 302 transmits, to the main control unit 300, information indicating that the folder selection operation has been accepted. Here, the "folder selection operation" is, for example, the selection of a folder of the document management service 30 displayed in the area 501 for displaying repository information such as a tree view. Or, a desired folder that has been found by inputting search conditions, not shown, or a folder of the document management service 30 containing documents, may be selected.

Then, in step S113, upon accepting the user instruction to perform a folder selection operation in step S112, the main control unit 300 transmits information for specifying the folder to the request reception unit 700 of the document management service. The request reception unit 700 instructs the document information management unit 701 to acquire a listing of documents in the folder from the document information storage unit 702, using the information specifying the folder that was transmitted from the main control unit 300. The request reception unit 700 then notifies the main control unit 300 of the acquired document listing. The main control unit 300 instructs the information display unit 301 to display, on the display 108, the document listing information notified by the request reception unit 700. More specifically, a listing of documents stored in the folder of the document management service 30 is displayed in the document listing area 502 for displaying documents in the form of thumbnails or icons. Through the user interface displayed on the display 108 in step S113, the user can select and associate a document data piece and a digital multifunction peripheral, i.e., the user can establish an association therebetween.

Then, in step S114, upon accepting the user operation for associating a document data piece 504 and a digital multifunction peripheral 505, the information acquisition unit 302 transmits that information to the main control unit 300.

Then, in step S115, upon accepting the user instruction to perform an association operation in step S114, the main control unit 300 transmits information for specifying the selected document data, to the request reception unit 700 of the document management service 30. The request reception unit 700 instructs the document information management unit 701 to acquire the scan and transmission settings information stored in the document information storage unit 702 in association with the selected document data, and notifies the main control unit 300 of the acquired information. Target scan and transmission settings information can be specified by using the information specifying the document data that was transmitted from the main control unit 300 as part of step S115.

Then, in step S116, upon acquiring the scan and transmission settings information in step S115, the main control unit 300 transmits a registration request as well as the scan and transmission settings information to the request reception unit 400 of the digital multifunction peripheral 20. As a result, a request to register the scan and transmit button is issued.

Then, in step S117, upon receiving the scan/transmit button registration request in step S116, the request reception unit 400 of the digital multifunction peripheral 20 instructs the operation button management unit 401 to store the scan and transmission settings information in the operation button storage unit 402.

Then, in step S118, the request reception unit 400 notifies the main control unit 300 of the client computer 10 of the result of the storage in the operation button storage unit 402 in step S117. The main control unit 300 instructs the information display unit 301 to display the scan/transmit button registration result notified by the request reception unit 400 on the display 108, in order to notify the user A.

Note that while, in step S113, a listing of documents in the document management service 30 is displayed upon receipt of a user instruction to perform a folder selection operation in step S112, a listing of documents that had previously been in the folder may be displayed. This allows scan and transmission settings information to be acquired and a scan and transmit button to be registered with the digital multifunction peripheral 20, using those documents that had previously been in the selected folder but are currently in the other folder(s).

Scan and Transmission Processing

As to scan and transmission processing, what makes the present exemplary embodiment different from the document distribution system of the first exemplary embodiment is that the destination to which scanned documents are distributed from the digital multifunction peripheral 20 is the document management service 30 rather than the client PC 10. A user A performs scanning and transmission via the digital multifunction peripheral 20, and acquires documents from and stores documents in the document management service 30 in the document distribution system according to the exemplary embodiment of the present invention. Below, only steps that are different from the first exemplary embodiment are described with reference to FIG. 10.

In step S204, the function execution unit 403 of the digital multifunction peripheral 20 instructs the data transmission unit 406 to transmit the scanned document data obtained in step S203 to the storage path specified by the scan and transmit button.

Then, in step S205, the data reception unit 703 of the document management service 30 receives the scanned document data transmitted by the digital multifunction peripheral 20 in step S204 and stores the received data in the specified storage path. Here, as previously described, there is a case where the path in which the document data has been stored can be neither directly referred to nor read or written to by the digital multifunction peripheral 20. In that case, the digital multifunction peripheral 20 may transmit the scanned document via a protocol, not shown, such as FTP, a Web service, or the like. In this case, a monitor program, not shown, may be activated and the scanned document may automatically be shifted to the specified storage path.

As described above, according to the second exemplary embodiment of the present invention, the use of documents stored in the document management service and scan and transmission settings information associated with the documents allows a user to reuse accurate settings in which scanning and transmission have been performed with a digital multifunction peripheral.

Third Exemplary Embodiment

A third exemplary embodiment of the present invention is described with reference to FIGS. 6, 13, and 14. What makes the third exemplary embodiment different from the document distribution systems according to the first and second exemplary embodiments is a user interface. A user associates a document icon 510 and a digital multifunction peripheral icon 511 with each other through a drag-and-drop operation, by operating the client application on the client computer 10 in the document distribution system of the present invention. This association operation enables a scan and transmit button to be registered with the digital multifunction peripheral 20. The details of the processing in each step in the document distribution system according to the third exemplary embodiment of the present invention are described below with reference to FIG. 6, which shows the scan/transmit button registration processing according to the first exemplary embodiment, FIG. 13, which shows the scan/transmit button registration processing according to the second exemplary embodiment, and FIG. 14, which shows an exemplary user interface according to the present exemplary embodiment.

Scan/Transmit Button Registration Processing

A user A registers a scan and transmit button with the digital multifunction peripheral 20 via the client application of the client computer 10 in the document distribution system according to the exemplary embodiment of the present invention. FIG. 6 shows the scan/transmit button registration processing performed in the document distribution system according to the first exemplary embodiment, and FIG. 13 shows the scan/transmit button registration processing performed in the document distribution system according to the second exemplary embodiment. Below, only different steps are described with reference to FIGS. 6 and 13. Note that the reference numerals used in FIG. 13 are shown within parentheses.

This procedure starts upon activation of the client application of the document distribution system according to the present exemplary embodiment in accordance with a user instruction. First, in step S101, the main control unit 300 instructs the information display unit 301 to display the user interface of the client application on the display 108 of the client computer 10.

At this time, the main control unit 300 displays, in the document listing area 502 in the form of icons, such as a document icon 510, a listing of document data pieces in the folder selected by a user from the area 501 for displaying repository information in, for example, a tree view. Here, the icons may be thumbnails of the document data pieces or may be formed into a preview display, etc.

The main control unit 300 also acquires information about peripherals, such as the digital multifunction peripheral 20, that are operable by the client application, and displays the peripherals in the peripherals listing area in the form of icons, such as a digital multifunction peripheral icon 511.

In step S102 (S114), the user drags and drops a document icon 510 onto a digital multifunction peripheral icon 511 via the user interface displayed on the display 108 in step S101 (S113). Upon accepting the user operation for associating the document icon 510 and the digital multifunction peripheral icon 511 by a drag-and-drop operation, the information acquisition unit 302 transmits information regarding the association to the main control unit 300. Of course, a digital multifunction peripheral icon 511 may alternatively be dragged onto a document icon 510 in order to establish an association therebetween.

Figure 14:
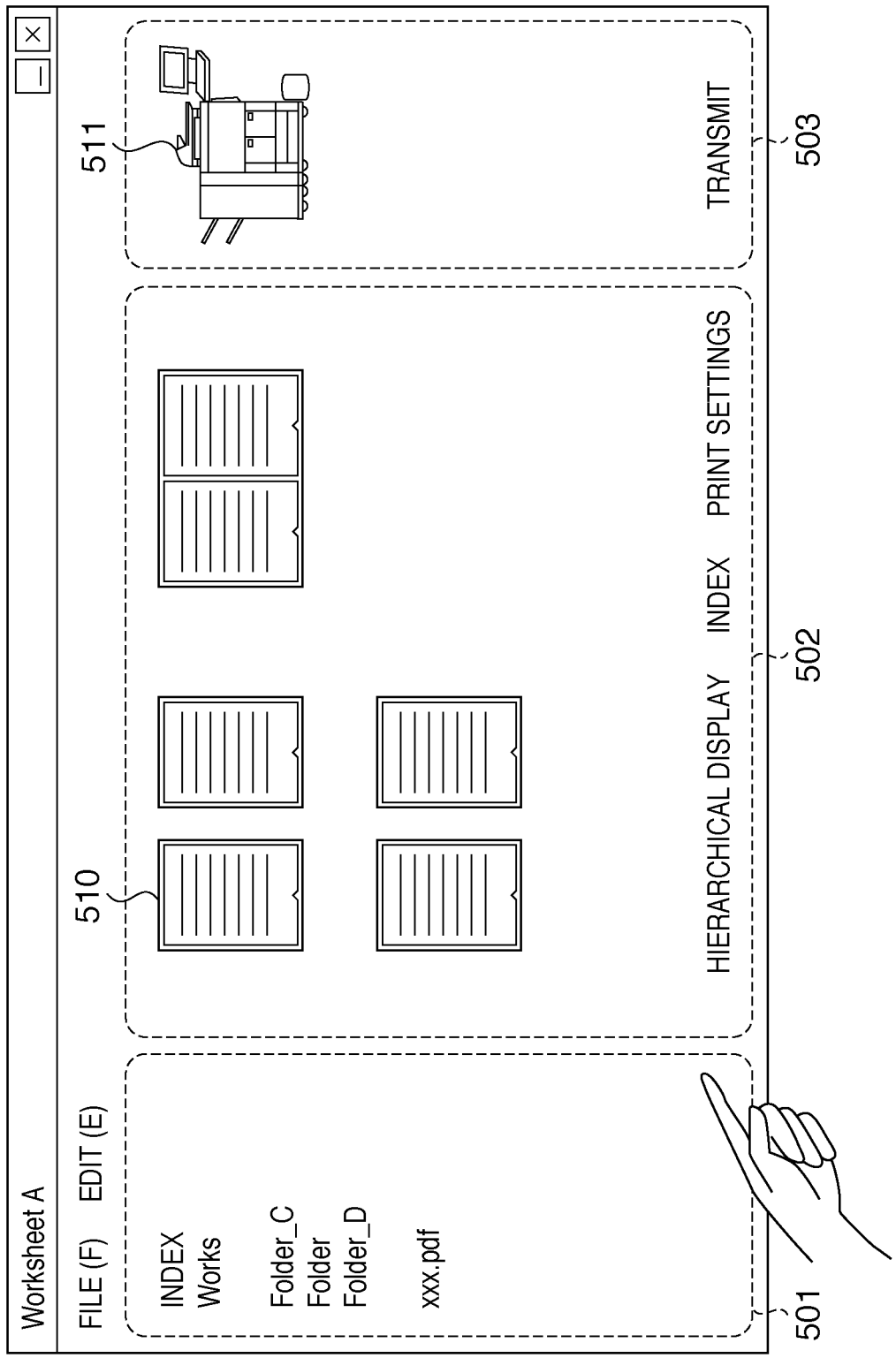
FIG. 14 shows an exemplary user operation for associating a document icon and a digital multifunction peripheral icon with each other by a drag-and-drop operation, using a client application in a document distribution system according to a third exemplary embodiment of the present invention.

FIG. 14 shows an exemplary user operation for associating a document icon and a digital multifunction peripheral icon by a drag-and-drop operation. Note that as to the user interface of the client application shown in FIG. 14 and its operability, the form and configuration thereof and a control method therefor are not limited to the example described above, and they may be in any form as long as necessary functions can be implemented.

According to the third exemplary embodiment of the present invention, by performing an intuitive operation, i.e., the dragging and dropping of a document icon onto a digital multifunction peripheral icon or vice versa, a user can omit an operation step and can create scan and transmission settings information and register a scan and transmit button with a digital multifunction peripheral.

Fourth Exemplary Embodiment

A fourth exemplary embodiment of the present invention is described with reference to FIGS. 4, 12, and FIG. 15. What makes the fourth exemplary embodiment different from the document distribution systems according to the first, second, and third exemplary embodiments is that, if a scan and transmit button having the same settings is already present when attempting to register a scan and transmit button with the digital multifunction peripheral 20, only reference information about the scan and transmit button having the same settings is stored. This avoids duplicate registrations of a plurality of scan and transmit buttons having the same settings. This procedure, thus, results in the effective use of resources of the digital multifunction peripheral 20. The details of the processing in each step in the document distribution system according to the fourth exemplary embodiment of the present invention are described below with reference to FIG. 4, which shows the configuration according to the first exemplary embodiment, FIG. 12, which shows the configuration according to the second exemplary embodiment, and FIG. 15, which shows scan/transmit button registration processing according to the present exemplary embodiment.

Registration of Scan/Transmit Button with Digital Multifunction Peripheral

As to the processing for registering a scan and transmit button with a digital multifunction peripheral, what makes the fourth exemplary embodiment different from the document distribution systems according to the first, second, and third exemplary embodiments is the following. That is, the process of registering a scan and transmit button with the digital multifunction peripheral 20 includes the step of determining whether or not any scan and transmit button having the same settings is already present.

In step S104, when a request to register a scan and transmit button is issued from the client application of the client computer 10 in the document distribution system according to the exemplary embodiment of the present invention, the scan and transmit button is registered with the digital multifunction peripheral 20. FIG. 15 is a flow chart showing a procedure in the process of registering a scan and transmit button with the digital multifunction peripheral 20. Below, only different steps are described with reference to FIGS. 4, 12, and 15.

Figure 15:
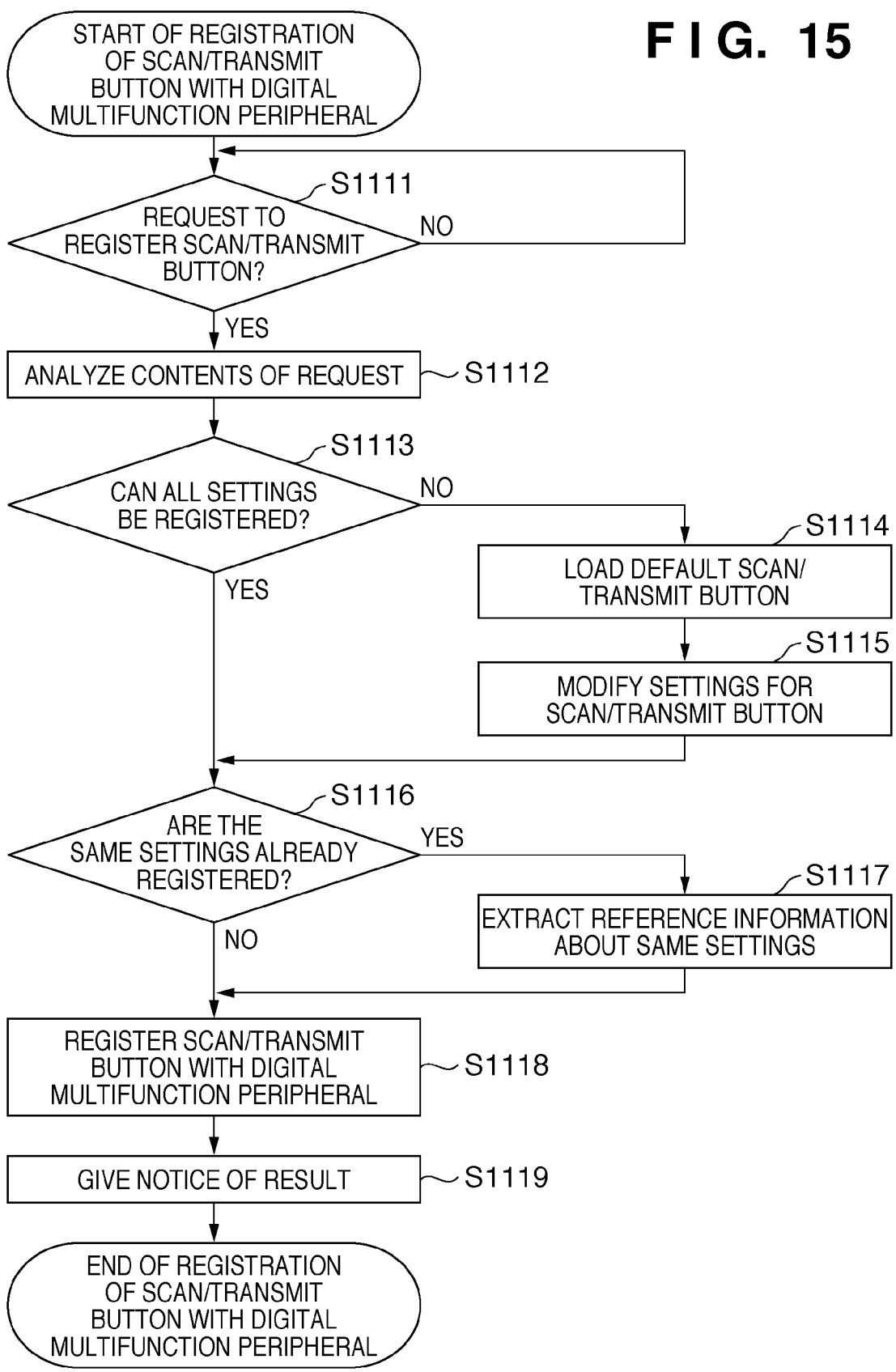
FIG. 15 is a flow chart showing a procedure in the process of registering a scan and transmit button with a digital multifunction peripheral in a document distribution system according to a fourth exemplary embodiment of the present invention.

The processing from steps S1111 to S1115 shown in FIG. 15 is identical to that from steps S1101 to S1105 shown in FIG. 8, so the descriptions of these steps are omitted in the present exemplary embodiment.

Then, in step S1116, the operation button management unit 401 determines whether any already-registered scan and transmit button has the same settings as the scan and transmit button to be registered, by searching for the settings for the already-registered scan and transmit buttons stored in the operation button storage unit 402. The settings for each already registered scan and transmit button consist of a pair of scan settings and a storage location. Here, whether the settings are the same or not may be determined by a comparison of all the settings, i.e., exact matching, or may be determined by a comparison of only the scan settings. However, this is not intended to limit the criteria used for determination. Furthermore, if any modification or addition of the contents of the scan settings is necessary, the modified or information-added scan settings are used for comparison and determination.

Then, when having determined in step S1116 that the scan and transmit button having the same settings had already been registered, then in step S1117, the operation button management unit 401 extracts reference information for the scan and transmit button to be referred to, from the operation button storage unit 402. Here, the reference information for the scan and transmit button may be an ID for specifying the scan and transmit button to be referred to, or may be any other means.

Then, in step S1118, the operation button management unit 401 stores, in the operation button storage unit 402, only reference information about a new scan and transmit button, or, if the same settings are already present, only reference information about the scan and transmit button to be referred to. In the latter case, the reference information to be stored is the information extracted in step S1117. Through this operation, a scan and transmit button is registered with the digital multifunction peripheral 20 and the request reception unit 400 is notified of the registration result. Here, the registration of a scan and transmit button may be performed for each user, or may be performed for each group so as to allow users in the group to share the button, or may be performed so as to allow all users to share the button.

Then, in step S1119, the request reception unit 400 notifies the main control unit 300 of the client computer 10 of the scan/transmit button registration result obtained in step S1118.

According to the fourth exemplary embodiment of the present invention, if a scan and transmit button having the same settings is already present when registering a scan and transmit button with a digital multifunction peripheral, only reference information about the scan and transmit button having the same settings is stored in order to avoid duplicate registration. This enables the effective use of the resources of a digital multifunction peripheral without the user giving any consideration of the duplication of buttons.

Note that the present invention may be applied to a system consisting of a plurality of apparatuses (such as a host computer, an interface device, a reader, a printer, and the like), or may be applied to an apparatus consisting of a single device (such as a copy machine, a facsimile machine, or the like). There may alternatively be provided a system or apparatus with a storage medium in which a program for achieving a function in an exemplary embodiment described above is stored and by the system or apparatus reading out and running the program stored in the storage medium. In this case, the program itself that is read out from the storage medium realizes the functionality of any embodiment described above, and the program itself and the storage medium in which the program is stored constitute the main features of the present invention.

The present invention also includes the case where an OS or the like that is running on a computer can perform part or all of the actual processing based on instructions in the program, thereby realizing the functionality of the present invention. Furthermore, the present invention is also applicable to the case where the program read from the storage medium can be written to a memory provided in a function expansion board inserted in a computer or a function expansion unit connected to a computer. In this case, a CPU or the like provided in the function expansion board or the function expansion unit performs part or all of the actual processing based on instructions written in the program, thereby realizing the functionality of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-181987 filed Jul. 11, 2008, which is hereby incorporated by reference herein in its entirety.

What is claimed is:

1. An information processing apparatus for creating scan and transmission settings which are to be registered to an image input apparatus, the information processing apparatus comprising:
    a selection unit configured to select, based on a user's operation, one document from a plurality of documents being stored in a storage unit;
    an extraction unit configured to extract scan settings by analyzing the selected one document;
    an acquisition unit configured to acquire a storage location where the selected one document has been stored; and
    a transmission unit configured to transmit a request for registering a button associated with the extracted scan settings and the acquired storage location to the image input apparatus, wherein the image input apparatus registers the button that is associated with the extracted scan settings and the acquired storage location when receiving the request, and wherein the registered button is used for scanning another document based on the scan settings associated with the registered button and transmitting scan data of the scanned another document to the storage location associated with the registered button when the registered button is selected by a user of the image input apparatus.

2. The information processing apparatus according to claim 1, wherein
    the selection unit selects, based on the user's operation, the one document from the plurality of documents managed by a document management apparatus that is connected to the image input apparatus; and
    wherein the extraction unit extracts the scan settings from the document management apparatus in which the scan settings are stored in association with the selected one document.

3. The information processing apparatus according to claim 1,
    wherein the storage location acquired by the acquisition unit is either a storage area within a memory unit of the information processing apparatus or a storage area within an external memory unit accessible by the information processing apparatus.

4. The information processing apparatus according to claim 3, wherein the storage location acquired by the acquisition unit is either a path indicating a storage location of the selected one document in the storage area within the memory unit of the information processing apparatus, or a path indicating a storage location of the selected one document in the storage area within the external memory unit accessible by the information processing apparatus.

5. A document distribution system comprising:
the information processing apparatus according to claim 1, and
the image input apparatus for receiving the request transmitted from the information processing apparatus, the image input apparatus comprising:
a display unit configured to display, on a user interface, the button which is associated with the extracted scan settings and the acquired storage location; and
a scan and transmission unit, configured to, when the displayed button is selected by a user of the image input apparatus, scan a document based on the scan settings associated with the selected button and transmit scan data of the scanned document data to the storage location associated with the selected button.

6. A control method for an information processing apparatus that is for creating scan and transmission settings which are to be registered to an image input apparatus, the control method comprising:
selecting, based on a user's operation, one document from a plurality of documents being stored in a storage unit;
extracting scan settings from the selected one document;
acquiring a storage location where the selected one document has been stored; and
transmitting a request for registering a button associated with the extracted scan settings and the acquired storage location to the image input apparatus, wherein the image input apparatus registers the button that is associated with the extracted scan settings and the acquired storage location when receiving the request, and wherein the registered button is used for scanning another document based on the scan settings associated with the registered button and transmitting scan data of the scanned another document to the storage location associated with the registered button when the registered button is selected by a user of the image input apparatus.

7. A non-transitory computer-readable recording medium storing a program that causes a computer to execute the control method according to claim 6.

* * * * *